(12) United States Patent
Bonabeau et al.

(10) Patent No.: US 7,707,220 B2
(45) Date of Patent: Apr. 27, 2010

(54) METHODS AND APPARATUS FOR INTERACTIVE SEARCHING TECHNIQUES

(75) Inventors: Eric Bonabeau, Winchester, MA (US); Pablo Funes, Somerville, MA (US)

(73) Assignee: Icosystem Corporation, Cambridge, MA (US)

( * ) Notice: Subject to any disclaimer, the term of this patent is extended or adjusted under 35 U.S.C. 154(b) by 6 days.

(21) Appl. No.: 11/537,143

(22) Filed: Sep. 29, 2006

(65) Prior Publication Data

US 2007/0067279 A1 Mar. 22, 2007

Related U.S. Application Data

(63) Continuation-in-part of application No. 11/176,968, filed on Jul. 6, 2005.

(60) Provisional application No. 60/585,807, filed on Jul. 6, 2004, provisional application No. 60/721,637, filed on Sep. 29, 2005.

(51) Int. Cl.
*G06F 17/30* (2006.01)
(52) U.S. Cl. .......................... 707/758; 707/759; 706/13
(58) Field of Classification Search .................. 707/3, 707/1, 2, 4, 5; 706/13
See application file for complete search history.

(56) References Cited

U.S. PATENT DOCUMENTS

| 4,700,295 | A | 10/1987 | Katsof et al. | |
| 4,796,194 | A | 1/1989 | Atherton | 700/103 |
| 4,935,877 | A | 6/1990 | Koza | |
| 5,136,686 | A | 8/1992 | Koza | 706/13 |
| 5,148,513 | A | 9/1992 | Koza et al. | |
| 5,195,172 | A | 3/1993 | Elad et al. | 706/62 |
| 5,233,513 | A | 8/1993 | Doyle | 705/7 |
| 5,428,712 | A | 6/1995 | Elad et al. | 706/46 |
| 5,465,221 | A | 11/1995 | Merat et al. | 702/83 |
| 5,541,835 | A | 7/1996 | Dextraze et al. | |
| 5,568,590 | A | 10/1996 | Tolson | 706/13 |
| 5,581,657 | A | 12/1996 | Lyon | 706/13 |

(Continued)

FOREIGN PATENT DOCUMENTS

EP 1235180 8/2002

(Continued)

OTHER PUBLICATIONS

Kraft et al., "The Use of Genetic Programming to build queries for Information Retrieval", IEEE, 1994, pp. 468-473, accessed Online at <http://ieeexplore.ieee.org/stamp/stamp.jsp?arnumber=00349905> on Apr. 1, 2009.*

(Continued)

*Primary Examiner*—Charles Rones
*Assistant Examiner*—Phuong-Thao Cao
(74) *Attorney, Agent, or Firm*—Foley Hoag LLP

(57) ABSTRACT

Methods and systems for searching comprise presenting a first information set to a user, receiving feedback, applying an evolutionary algorithm based on the feedback to generate a search query, causing the search query to be executed to generate a second information set, and presenting the second information set to the user. Then, in response to user input, the first information set is again presented to the user; feedback is again received, an evolutionary algorithm is again applied based on the feedback to generate a search query, and the new search query is caused to be executed to generate a third information set which is presented to the user.

51 Claims, 7 Drawing Sheets

U.S. PATENT DOCUMENTS

| | | | |
|---|---|---|---|
| 5,617,510 A | 4/1997 | Keyrouz et al. | 706/45 |
| 5,708,774 A | 1/1998 | Boden | 714/38 |
| 5,737,581 A | 4/1998 | Keane | 703/6 |
| 5,761,381 A | 6/1998 | Arci et al. | 706/13 |
| 5,761,494 A | 6/1998 | Smedley et al. | 707/4 |
| 5,793,931 A | 8/1998 | Hillis | 706/13 |
| 5,799,304 A * | 8/1998 | Miller | 707/7 |
| 5,809,489 A | 9/1998 | Davidor et al. | 706/13 |
| 5,855,015 A * | 12/1998 | Shoham | 707/5 |
| 5,858,462 A | 1/1999 | Yamazaki et al. | 427/226 |
| 5,864,633 A | 1/1999 | Opsal et al. | 382/141 |
| 5,867,397 A | 2/1999 | Koza et al. | 703/14 |
| 5,890,133 A | 3/1999 | Ernst et al. | 705/7 |
| 5,890,146 A | 3/1999 | Wavish et al. | 706/46 |
| 5,897,629 A | 4/1999 | Shinagawa et al. | 706/13 |
| 5,930,780 A | 7/1999 | Hughes et al. | 706/13 |
| 5,963,447 A | 10/1999 | Kohn et al. | 700/49 |
| 5,963,939 A | 10/1999 | McCann et al. | 707/4 |
| 5,970,487 A | 10/1999 | Shackleford et al. | 707/6 |
| 5,978,507 A | 11/1999 | Shackleton et al. | |
| 5,987,457 A * | 11/1999 | Ballard | 707/5 |
| 6,029,139 A | 2/2000 | Cunningham et al. | 705/10 |
| 6,055,523 A | 4/2000 | Hillis | 706/13 |
| 6,088,690 A | 7/2000 | Gounares et al. | |
| 6,094,652 A * | 7/2000 | Faisal | 707/5 |
| 6,098,059 A | 8/2000 | Nordin et al. | 706/13 |
| 6,125,351 A | 9/2000 | Kauffman | 705/7 |
| 6,185,548 B1 | 2/2001 | Schwartz et al. | |
| 6,236,955 B1 | 5/2001 | Summers | 703/6 |
| 6,249,714 B1* | 6/2001 | Hocaoglu et al. | 700/97 |
| 6,253,200 B1 | 6/2001 | Smedley et al. | 707/4 |
| 6,282,527 B1 | 8/2001 | Gounares et al. | |
| 6,321,205 B1 | 11/2001 | Eder | 705/7 |
| 6,327,582 B1 | 12/2001 | Worzel | 706/13 |
| 6,336,110 B1 | 1/2002 | Tamura et al. | 706/46 |
| 6,349,238 B1 | 2/2002 | Gabbita et al. | |
| 6,408,263 B1 | 6/2002 | Summers | 703/6 |
| 6,411,373 B1 | 6/2002 | Garside et al. | 356/39 |
| 6,424,358 B1 | 7/2002 | DiDomizio et al. | 715/762 |
| 6,430,545 B1 | 8/2002 | Honarvar et al. | 706/47 |
| 6,434,435 B1 | 8/2002 | Tubel et al. | 700/30 |
| 6,434,492 B1 | 8/2002 | Pollack et al. | |
| 6,434,542 B1 | 8/2002 | Farmen et al. | 706/45 |
| 6,449,761 B1 | 9/2002 | Greidinger et al. | 716/11 |
| 6,468,770 B1 | 10/2002 | Keyes et al. | |
| 6,480,832 B2 | 11/2002 | Nakisa | 706/13 |
| 6,484,166 B1 | 11/2002 | Maynard | |
| 6,490,566 B1 | 12/2002 | Schmidt | |
| 6,513,024 B1 | 1/2003 | Li | 706/45 |
| 6,523,016 B1 | 2/2003 | Michalski | 706/12 |
| 6,528,715 B1 | 3/2003 | Gargi | 84/615 |
| 6,571,282 B1 | 5/2003 | Bowman-Amuah | 709/219 |
| 6,576,919 B1 | 6/2003 | Yoshida et al. | 250/548 |
| 6,636,848 B1* | 10/2003 | Aridor et al. | 707/3 |
| 6,662,167 B1 | 12/2003 | Xiao | |
| 6,678,618 B1 | 1/2004 | Schwartz et al. | |
| 6,709,330 B1 | 3/2004 | Klein et al. | 463/9 |
| 6,721,647 B1* | 4/2004 | Kita et al. | 701/106 |
| 6,741,959 B1* | 5/2004 | Kaiser | 704/7 |
| 6,745,184 B1 | 6/2004 | Choi et al. | 707/6 |
| 6,760,335 B1 | 7/2004 | Andersson et al. | 370/395.2 |
| 6,763,354 B2 | 7/2004 | Hosken | 707/6 |
| 6,848,104 B1 | 1/2005 | Van Ee et al. | 719/310 |
| 6,865,571 B2 | 3/2005 | Inaba et al. | 707/5 |
| 6,882,988 B2* | 4/2005 | Subbu et al. | 706/10 |
| 6,895,286 B2 | 5/2005 | Kaji et al. | |
| 6,895,396 B2 | 5/2005 | Schwartz et al. | |
| 6,895,405 B1 | 5/2005 | Choi et al. | 707/101 |
| 6,912,587 B1 | 6/2005 | O'Neil | 709/232 |
| 6,928,434 B1 | 8/2005 | Choi et al. | 707/6 |
| 6,934,405 B1 | 8/2005 | Schuessler | 382/101 |
| 6,937,993 B1 | 8/2005 | Gabbita et al. | |
| 6,941,287 B1 | 9/2005 | Vaidyanathan et al. | |
| 6,947,844 B2 | 9/2005 | Steitz et al. | |
| 6,947,845 B2 | 9/2005 | Steitz et al. | |
| 6,947,930 B2 | 9/2005 | Anick et al. | 707/5 |
| 6,950,270 B2 | 9/2005 | Lyle et al. | 360/78.04 |
| 6,950,712 B2 | 9/2005 | Ulyanov et al. | 700/28 |
| 6,952,650 B2 | 10/2005 | Steitz et al. | |
| 6,952,700 B2 | 10/2005 | Modha et al. | 707/101 |
| 6,957,200 B2 | 10/2005 | Buczak et al. | 706/13 |
| 6,996,560 B1 | 2/2006 | Choi et al. | 707/6 |
| 7,000,700 B2 | 2/2006 | Cairns et al. | 166/255.1 |
| 7,003,504 B1 | 2/2006 | Angus et al. | 707/1 |
| 7,003,516 B2 | 2/2006 | Dehlinger et al. | |
| 7,003,560 B1 | 2/2006 | Mullen et al. | |
| 7,007,006 B2 | 2/2006 | Zilio et al. | 707/2 |
| 7,013,238 B1* | 3/2006 | Weare | 702/182 |
| 7,035,740 B2 | 4/2006 | Kermani | 702/19 |
| 7,043,463 B2* | 5/2006 | Bonabeau et al. | 706/13 |
| 7,047,169 B2 | 5/2006 | Pelikan et al. | 703/2 |
| 7,070,647 B2 | 7/2006 | Fujimori et al. | 106/691 |
| 7,076,475 B2 | 7/2006 | Honarvar | 706/47 |
| 7,117,202 B1* | 10/2006 | Willoughby | 707/3 |
| 7,127,695 B2 | 10/2006 | Huang et al. | 716/10 |
| 7,139,665 B2 | 11/2006 | Datta et al. | |
| 7,181,438 B1* | 2/2007 | Szabo | 707/2 |
| 7,190,116 B2 | 3/2007 | Kobayashi et al. | 313/512 |
| 7,191,164 B2 | 3/2007 | Ray et al. | 706/52 |
| 7,194,461 B2* | 3/2007 | Kawatani | 707/4 |
| 7,280,986 B2 | 10/2007 | Goldberg et al. | 706/13 |
| 7,333,960 B2 | 2/2008 | Bonabeau et al. | |
| 7,356,518 B2 | 4/2008 | Bonabeau et al. | |
| 7,457,678 B2 | 11/2008 | Smith et al. | |
| 7,491,494 B2 | 2/2009 | Liu et al. | |
| 2001/0003824 A1 | 6/2001 | Schnier | 709/203 |
| 2002/0083031 A1 | 6/2002 | De Varax | |
| 2002/0156773 A1 | 10/2002 | Hildebrand et al. | 707/3 |
| 2002/0161747 A1* | 10/2002 | Li et al. | 707/3 |
| 2002/0174126 A1 | 11/2002 | Britton et al. | |
| 2003/0088458 A1 | 5/2003 | Afeyan et al. | 705/10 |
| 2004/0010479 A1* | 1/2004 | Ali | 706/13 |
| 2004/0117333 A1* | 6/2004 | Voudouris et al. | 706/13 |
| 2004/0117355 A1 | 6/2004 | Lef et al. | 707/3 |
| 2004/0133355 A1 | 7/2004 | Schneider | 702/19 |
| 2004/0162738 A1 | 8/2004 | Sanders et al. | 705/1 |
| 2004/0204957 A1 | 10/2004 | Afeyan et al. | 705/1 |
| 2004/0243388 A1 | 12/2004 | Corman et al. | |
| 2004/0254901 A1 | 12/2004 | Bonabeau et al. | 706/13 |
| 2005/0119983 A1 | 6/2005 | Bonabeau et al. | 706/46 |
| 2005/0165763 A1* | 7/2005 | Li et al. | 707/3 |
| 2005/0187926 A1 | 8/2005 | Britton et al. | |
| 2005/0198026 A1 | 9/2005 | Dehlinger et al. | |
| 2005/0261953 A1 | 11/2005 | Malek et al. | |
| 2006/0010117 A1 | 1/2006 | Bonabeau et al. | 707/3 |
| 2006/0167862 A1* | 7/2006 | Reisman | 707/3 |
| 2008/0040671 A1 | 2/2008 | Reed | |

FOREIGN PATENT DOCUMENTS

| | | |
|---|---|---|
| WO | WO 00/02136 | 1/2000 |
| WO | WO 00/02138 | 1/2000 |
| WO | WO 00/54185 | 9/2000 |
| WO | WO 02/27541 | 4/2002 |

OTHER PUBLICATIONS

Zhou et al., "Relevance Feedback in Image Retrieval: A comprehensive review", Springer-Verlag 2003, pp. 536-544, accessed online at <http://www.springerlink.com/content/gfpvl19h67wpgx3g/> on Apr. 1, 2009.*

Smith et al., "The use of genetic programming to build Boolean queries for text retrieval through relevance feedback", Journal of Information Science, vol. 23, No. 6, 1997, pp. 423-431.*

Yang et al., "Query Optimization in Information Retrieval Using Genetic Algorithms", Proceedings of the 5th International Conference on Genetic Algorithms, 1993, pp. 603-613.*

Stejic et al., "Genetic algorithm-based relevance feedback for image retrieval using local similarity patterns", Information Processing and Management, vol. 39, 2003, pp. 1-23.*

Klabbankoh et al., "Applied genetic Algorithms in Information Retrieval", 1999, pp. 1-6, accessed online at <http://www.journal.au.edu/ijcim/sep99/02-drouen.pdf> on Apr. 1, 2009.*

Lopez—Pujalte et al., "Genetic Algorithms in relevance feedback: a second test and new contributions", Information Processing and Management, vol. 39, 2003, pp. 669-687, accessed online at <http://www.scimago.es/publications/ipm-03.pdf> on Apr. 1, 2009.*

Meilhac et al., "Relevance Feedback and Category Search in Image Databases", 1999, pp. 1-7, accessed online at <http://citeseerx.ist.psu.edu/viewdoc/summary?doi=10.1.1.46.5154> on Apr. 1, 2009.*

Sciascio et al., "Content-based Image Retrieval over the Web using Query by Sketch and Relevance Feedback", Proceedings of 4th International Conference on Visual Information System, 1999, pp. 123-130, accessed online at <http://citeseerx.ist.psu.edu/viewdoc/summary?doi=10.1.1.25.9281> on Apr. 1, 2009.*

MacArthur et al., "Relevance Feedback Decision Trees in Content-based Image Retrieval", Proceedings of the IEEE Workshop on Content-based Access of Image and Video Libraries, 2000, pp. 1-5, accessed online at <http://cobweb.ecn.purdue.edu/RVL/Publications/MacArther00Relevance.pdf> on Apr. 1, 2009.*

Giacinto et al., "Instance-based Relevance Feedback for Image Retrieval", 2004, pp. 1-8, accessed online at <http://books.nips.cc/papers/files/nips17/NIPS2004_0502.pdf> on Apr. 1, 2009.*

Xin et al., "Relevance Feedback for Content-based Image Retrieval using Bayesian Network", The Pan-Sydney Area Workshop on Visual Information Processing, 2003, pp. 1-4, accessed online at <http://crpit.com/confpapers/CRPITV36Xin.pdf> on Apr. 1, 2009.*

International Search Report for PCT/US2007/072101.

Bäck, Thomas, et al., "Handbook of Evolutionary Computation," 1997, Publishing Ltd. and Oxford University Press, p. 14, lines 15-16. (*A1.3 Advantages (and disadvantages) of evolutionary computation over other approaches*).

Baeza-Yates R., et al: "Modern Information Retrieval, Chapter 5: Query Operations" Modern Information Retrieval, Harlow: Addison-Wesley, GB, 1999, pp. 117-139, XP002311981, ISBN: 0-201-39829-X.

Banks, Jerry, "Discrete-Event System Simulation, "Second Edition, 1996, Prentice-Hall, Upper Saddle River, New Jersey, p. 3-55, *1 Introduction to Simulation*.

Banks, Jerry, "Handbook of Simulation: Principles, Methodology, Advances, Applications, and Practice," 1998, John Wiley & Sons, Inc., New York, New York. p. 15, line 15-22, *1.7 Steps in a Simulation Study*.

Banzhaf, Wolfgang, et al., "Genetic Programming: An Introduction on the Automatic Evolution of Computer Programs and Its Applications," 1998, Morgan Kaufmann Publishers, Inc., San Francisco, California, p. 14, *1 Genetic Programming as Machine Learning*.

Beasley D, et al.: "An Introduction to Genetic Algorithms", Vivek, National Centre for Softwre Technology, Bombay, In, vol. 7, No. 1, pp. 3-19, XPoo1061908, ISSN: 0970-8618.

Cortinas, Marty; "HPS to remodel Ithink simulator." (High Performance Systems Inc's Ithink 5.0 business-modeling, simulation software) (Product Announcement). MacWEEK, v11, n26, p. 29(2), Jul. 7, 1997.

Ferber, Jacques, "Multi-Agent Systems: An Introduction to Distributed Artificial Intelligence," 1999, Addison Wesley Longman Limited, Harlow, Essex, England, p. 1-48, *1 Principles of Multi-Agent Systems*.

Michalewicz, Zbigniew, "Genetic Algorithms + Data Structures = Evolution Programs," Third, Revised and Extended Edition, 1996, Springer-Verlag Berlin Heidelberg, p. 13-31, *GAs: What Are They?*.

Micro Saint 3.2 (278548); Micro Analysis & Design Inc., 4900 Pearl East Cir. #201E, Boulder, CO 80301, Jan. 1986.

Moss, Scott, et al., "Lecture Notes in Artificial Intelligence: Subseries of Lecture Notes in Computer Science: Multi-Agent-Based Simulation," Second International Workshop, MABS 2000, Boston, Massachusetts, Jul., Revised and Additional Papers, Springer-Verlag Berlin Heidelberg, p. 1-26, *Editorial Introduction: Messy Systems—The Target for Multi Agent Based Simulation*.

Srinivas, M., et al.: "Genetic Algorithms: A Survey" Computer, IEEE Service Center, Los Alamitos, CA, US, vol. 27, No. 6, Jun. 1, 1994, pp. 17-26, XP000438318, ISSN: 0018-9162.

Valenzuela, Christine L., "A Simple Evolutionary Algorithm for Multi-Objective Optimization (SEAMO)," Evolutionary Computation, 2002, 1:717-722 (2002).

Van Veldhuizen, David A., "Issues in Parallelizing Multiobjective Evolutionary Algorithms for Real World Applications," Proceedings of the 17th Symposium on Proceedings of the 2002 ACM Symposium on applied computing, Mar. 2002, pp. 595-602.

Zeigler, Bernard P., et al., "Theory of Modeling Simulation, Second Edition, Integrating Discrete Event and Continuous Complex Dynamic Systems," 2000, Academic Press, San Diego, California, p. 3-53, *1 Introduction to Systems Modeling Concepts*.

Buchsbaum, D. et al "Designing Collective Behavior in a Group of Humans Using a Real-Time Polling System and Interactive Evolution", Swarm Intelligence Symposium, 2005. SIS 2005. Proceedings 2005 IEEE Jun. 8-10, 2005 Publication pp. 15-21 (Our pp. 1-13).

Trifonov, I., et al "Resource Allocation for a Distributed Sensor Network", Swarm Intelligence Symposium, 2005. SIS 2005. Proceedings 2005 IEEE Jun. 8-10, 2005 Publication pp. 428-431 (Our pp. 1-4).

Gaudiano, P. et al "Evolving Behaviors for a Swarm of Unmanned Air Vehicles", Swarm Intelligence Symposium, 2005. SIS 2005. Proceedings 2005 IEEE Jun. 8-10, 2005 Publication pp. 317-324 (Our pp. 1-6, 13, 14).

Anderson, C., et al "Modeling, Quantifying and Testing Complex Aggregate Service Chains", Web Services, 2005. ICWS 2005. Proceedings. 2005 IEEE International Conference on Jul. 11-15, 2005 Publication pp. 274-281 vol. 1 (Our pp. 1-8).

Funes, P., et al., "Interactive Multi-Participant Tour Allocation", Evolutionary Computation, 2004. CEC2004. Congress on vol. 2, Jun. 19-23, 2004 pp. 1699-1705 vol. 2.

Malinchik, S., "Interactive Exploratory Data Analysis", Evolutionary Computation, 2004. CEC2004. Congress on vol. 1, Jun. 19-23, 2004 pp. 1098-1104 vol. 1.

Anderson, C., et al., "Evolutionary Testing as Both a Testing and Redesign Tool: a Study of a Shipboard Firemain's Valve and Pump Controls", Evolution Computation, 2004. CEC2004. Congress on vol. 1, Jun. 19-23, 2004 pp. 1089-1097 vol. 1.

Ashburn, T., et al., "Interactive Inversion of Financial Markets Agent-Based Models", Evolutionary Computation, 2004. CEC 2004. Congress on vol. 1, Jun. 19-23, 2004 pp. 522-529 vol. 1.

Pollack, J., et al., "Coevolutionary Robotics" Evolvable Hardware, 1999. Proceedings of the First NASA/DoD Workshop on Jul. 19-21, 1999 pp. 208-216.

Kumar, R., et al., "Assessing the Convergence of Rank-Based Multiobjective Genetic Algorithms", Genetic Algorithms in Engineering Systems: Innovations and Applications, 1997. GALESIA 97. Second International Conference on (Conf. Publ. No. 446) Sept. 2-4, 1997 pp. 19-23.

Van Der Meche, E., "Nevanlinna-Pick Interpolation with Degree Constraint: Complete Parameterization Based on Lyapunov Inequalities", Decision and Control, 2004. CDC. 43rd IEEE Conference on vol. 1, Dec. 14-17, 2004 pp. 411-416 vol. 1.

Kaltofen, E., et al., "Processor-Efficient Parallel Solution of Linear Systems. II. The Positive Characteristic and Singular Cases" Foundations of Computer Science, 1992. Proceedings., 33rd Annual Symposium on Oct. 24-27, 1992 pp. 714-723.

De Moor, B., et al., "A Geometrical Approach to the Maximal Corank Problems in the Analysis of Linear Relations", Decision and Control, 1986 25th IEEE Conference on vol. 25, Part 1, Dec. 1986 pp. 1990-1995.

Linkens, D.A., et al. "A Distributed Genetic Algorithm for Multivariable Fuzzy Control", Genetic Algorithms for Control Systems Engineering, IEEE Colloquium on May 28, 1993 pp. 9/1-9/3.

Sakawa, M., et al., "An Interactive Fuzzy Satisficing Method for Multiobjective Nonconvex Programming Problems With Fuzzy Numbers Through Coevolutionary Genetic Algorithms" Systems, Man and Cybernetics, Part B, IEEE Transactions on vol. 31, Issue 3, Jun. 2001 pp. 459-467 Digital Object Identifier 10.1109/3477.931546.

Hu Guoqiang, et al., "Multiobjective Optimization Scheduling Based on Fuzzy Genetic Algorithm in Cascaded Hydroelectric Stations", Transmission and Distribution Conference and Exhibition: Asia and Pacific, 2005 IEEE/PES 2005 p. 1-4 Digital Object Identifier 10.1109/TDC.2005.1547075.

Dasheng Liu, et al., "A Multiobjective Memetic Algorithm Based on Particle Swarm Optimization", Systems, Man and Cybernetics, Part B, IEEE Transactions on vol. 37, Issue 1, Feb. 2007 pp. 42-50 Digital Object Identifier 10. 1109/TSMCB.2006.883270.

Rodriguez-Vazquez, K. et al., "Multi-Objective Genetic Programming for Nonlinear System Identification", Electronics Letters vol. 34, Issue 9, Apr. 30, 1998 pp. 930-931.

Pu Han, et al., "A Multi-Objective Genetic Programming/NARMAX Approach to Chaotic Systems Identification", Intelligent Control and Automation, 2006. WCICA 2006. The Sixth World Congress on vol. 1, 2006 pp. 1735-1739 Digital Object Identifier 10.1109/WCICA. 2006.1712650.

Tan, K.C., et al., "Enhanced Distribution and Exploration for Multiobjective Evolutionary Algorithms", Evolutionary Computation, 2003. CEC '03. The 2003 Congress on vol. 4, Dec. 8-12, 2003 pp. 2521-2528 vol. 4 Digital Object Identifier 10.1109/CEC.2003. 1299405.

Maceachern, L.A., "Constrained Circuit Optimization Via Library Table Genetic Algorithms" Circuits and Systems, 1999. ISCAS '99. Proceedings of the 1999 IEEE International Symposium on vol. 6, May 30-Jun. 2, 1999 pp. 310-313 vol. 6 Digital Object Identifier 10.1109/ISCAS.1999.780157.

Carrano, E.G., et al., "Electric Distribution Network Multiobjective Design Using a Problem-Specific Genetic Algorithm", Power Delivery, IEEE Transactions on vol. 21, Issue 2, Apr. 2006 pp. 995-1005 Digital Object Identifier 10.1109/TPWRD.2005.858779.

Dong-Hyeok Cho, et al., "Multiobjective Optimal Design of Interior Permanent Magnet Synchronous Motors Considering Improved Core Loss Formula", IEEE Transactions on Energy Conversion, vol. 14, Issue 4, Dec. 1999 pp. 1347-1352 Digital Object Identifier 10.1109/60.815071.

Li-Cun Fang, et al., "Concurrent Optimization for Parameters of Powertrain and Control System of Hybrid Electric Vehicle Based on Multi-Objective Genetic Algorithms", SICE-ICASE, 2006. International Joint Conference Oct. 2006 p. 2424-2429 Digital Object Identifier 10.1109/SICE.2006.315114.

Kato, K., et al., "Large Scale Fuzzy Multiobjective 0-1 Programs Through Genetic Algorithms with Decomposition Procedures", Knowledge-Based Intelligent Electronic Systems, 1998. Proceedings KES '98. 1998 Second International Conference on vol. 1, Apr. 21-23, 1998 pp. 278-284 vol. 1 Digital Object Identifier 10.1109/KES.1998.725859.

Esbensen, H., et al., "Design Space Exploration Using the Genetic Algorithm," Circuit and Systems, 1996. ISCAS '96., 'Connecting the World'., 1996 IEEE International Symposium on vol. 4, May 12-15, 1996 pp. 500-503 vol. 4 Digital Object Identifier 10.1109/ISCAS. 1996.542010.

Then, T.W., et al., "Genetic Algorithms in Noisy Environment", Intelligent Control, 1994., Proceedings of the 1994 IEEE International Symposium on Aug. 16-18, 1994 pp. 225-230 Digital Object Identifier 10.1109/ISIC.1994.367813.

Gopinath, D., et al., "An Integrated Methodology for Multiobjective Optimal Component Placement and Heat Sink Sizing", Components and Packaging Technologies, IEEE Transactions on [see also Components, Packaging and Manufacturing Technology, Part A: Packaging Technologies, IEEE Transactions on] vol. 28, Issue 4, Dec. 2005 p. 869-876.

Dong-Joon Sim, et al., "Application of Vector Optimization Employing Modified Genetic Algorithm to Permanent Magnet Motor Design", Magnetics, IEEE Transactions on vol. 33, Issue 2, part 2, Mar. 1997 p. 1888-1891 Digital Object Identifier 10.1109/20. 582654.

Ishibushi, H., et al., "Comparison Between Single-Objective and Multi-Objective Genetic Algorithms: Performance Comparison and Performance Measures", Evolutionary Computation, 2006. CEC 2006. IEEE Congress on Jul. 16-21, 2006 pp. 1143-1150.

Li Mingqiang, et al., "GA-Based Multi-Objective Optimization" Intelligent Control and Automation, 2000. Proceedings of the 3rd World Congress on vol. 1, Jun. 28-Jul. 2, 2000 p. 637-640 vol. 1 Digital Object Identifier 10.1109/WCICA.2000.860050.

Wang, Jihua et al., "An Optimization-Based Algorithm for Job Shop Scheduling," University of Connecticut, Dept. of Electrical Engineering Publishing, MSL Papers, Mar. 28, 2004, p. 10.

International Search Report and Written Opinion for PCT/US 06/36765.

Ronald, S., "Duplicate genotypes in a genetic algorithm," Evolutionary Computation Proceedings, 1998. IEEE World Congress on Computational Intelligence., The 1998 IEEE International Conference on May 4-9, 1998 pp. 793-798, Digital Object Identifier 10.1109/ICEC. 1998.700153.

Cranfield, et al., "Exposure of magnetic bacteria to simulated mobile phone-type RF radiation has no impact on mortality," Nanobioscience, IEEE Transactions on vol. 2, Issue 3, Sep. 2003 pp. 146-149, Digital Object Identifier 10.1009/TNB.2003.816227.

Using Semantic Graphs in Clustering Process: Enhance Information Level—Brunner, B; Berrien, I; Web Intellegence, 2004. WI 2004. Proceedings. IEEE/WIC/ACM International Conference on Sep. 20-24, 2004 pp. 221-227; Digital Object Identifier 10.1109/WI.2004. 10106.

Multiobjective genetic optimization of diagnostic classifiers with implications for generating receiver operating characteristic curves—Kupinski, MA.; Anastasio, M.A.; Medical Imaging, IEEE Transactions on vol. 18, Issue 8, Aug. 1999 pp. 675-685 Digital Object Identifier 10.1109/42.796281.

Robust optimal power control for ad hoc networks—Fridman, A.; Grote, R.; Weber, S.; Dandekar, K.R.; Kam, M.; Information Sciences and Systems, 2006 40th Annual Conference on Mar. 22-24, 2006 pp. 729-733 Digital Object Identifier 10.1109/CISS.2006. 286562.

Cordon et al., "Evolutionary Learning of Boolean Queries by Multiobjective Genetic programming", springer-Verlag Berlin Heidelberg 2002, pp. 710-719, accessed online at <http://www.springerlink.com/content/1k1yyxfp7c4tq4he/fulltext.pdf> on Nov. 25, 2008.

Horng et al., "Applying Genetic Algorithms to Query Optimization in Document Retrieval", Information Processing and Management 36: 2000, pp. 737-759, Accessed Online at <http://www.sciencedirect.com/science>, on Nov. 25, 2008.

Pathak et al., "Effective Information Retrieval using Genetic Algorithms based Matching Functions Adaptation", Proceeding of the 33rd Hawaii International Conference on System Sciences, IEEE: 2000, pp. 1-8, Accessed online at <http://citeseerx.inst.psu.edu/viewdoc/summary?doi+10.1.1.104.1413> on Nov. 25, 2008.

International Search Report and Written Opinion for PCT/US04/24616.

International Search Report and Written Opinion for PCT/US06/38134.

International Search Report and Written Opinion for PCT/US08/52780.

Bentley, P. J. et al "New Trends in Evolutionary Computation", *Evolutionary Computation*, 2001. Proceedings of the 2001 Congress on May 27-30, 2001 Piscataway, NJ, USA, IEEE, vol. 1, pp. 162-169.

Kosorukoss, Alex, "Human Based Genetic Algorithm" 2001 IEEE International Conference on Systems Man and Cybernetics. SMC 2001. Tucson, AZ, Oct. 7-10, 2001; vol. 5 pp. 3464-3469.

Tasoulis, D.K. et al. "The new window density function for efficient evolutionary unsupervised clustering" *Evolutionary Computation*, 2005. The 2005 IEEE congress on vol. 3, Sep. 2-5, 2005, p. 2388-2394.

Honma, Masaki et al., "Knowledge Refinement Approach through Incorporating Case-based Knowledge in Maintenance Engineer Scheduling A1 System"; Systems, Man, and Cybernetics, 1999. IEEE SMC '99 Conference Proceedings. 1999 IEEE International Conference on vol. 5, Oct. 12-15, 1999 pp. 814-819 vol. 5.

Ioannidis, Stratos et al. "Fuzzy Supervisory Control of Manufacturing Systems", Robotics and Automation, IEEE Transactions on vol. 20, Issue 3, Jun. 2004 pp. 379-389.

Tao, Yongcai et al., "Adaptive Multi-round Scheduling Strategy for Divisible Workloads in Grid Environmetns", Information Networking, 2009. ICOIN 2009. International Conference on Jan. 21-24, 2009 pp. 1-5.

Tsourveloudis, Nikos et al., "Work-in-Process Scheduling by Evolutionary Tuned Distributed Fuzzy Controllers", Robotics and Automation, 2006. ICRA 2006 IEEE International Conference on May 15-19, 2006 pp. 1420-1425.

Supplementary European search report for Application Number EP 04 74 9609.

Supplementary European search report for Application Number EP 04 78 2505.

International Search Report and Written Opinion for PCT/US09/42594.

* cited by examiner

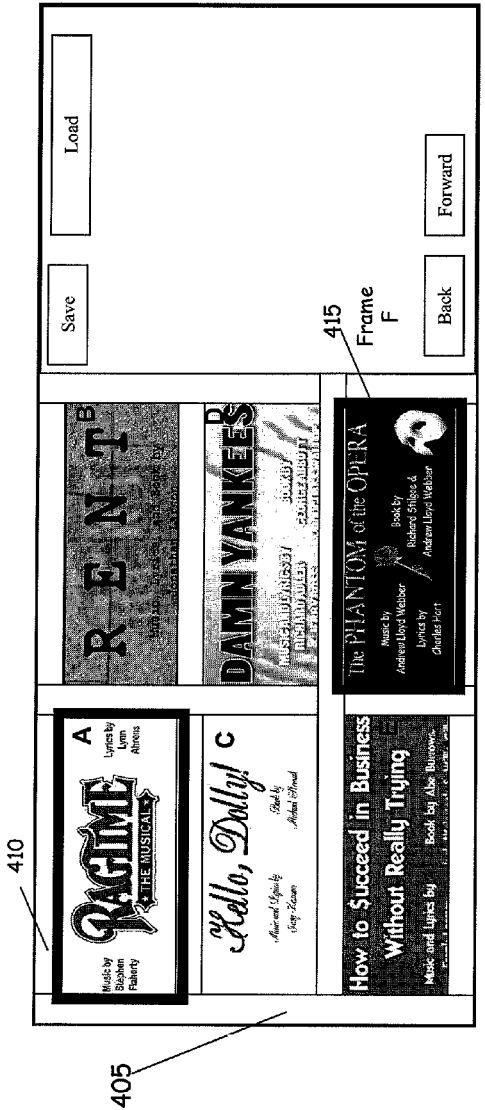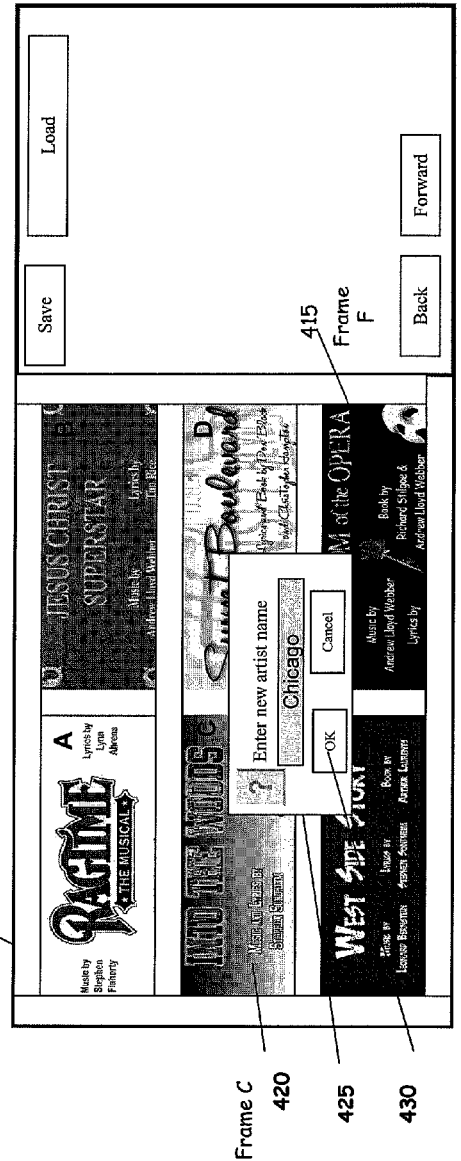
Figure 4a
Figure 4b

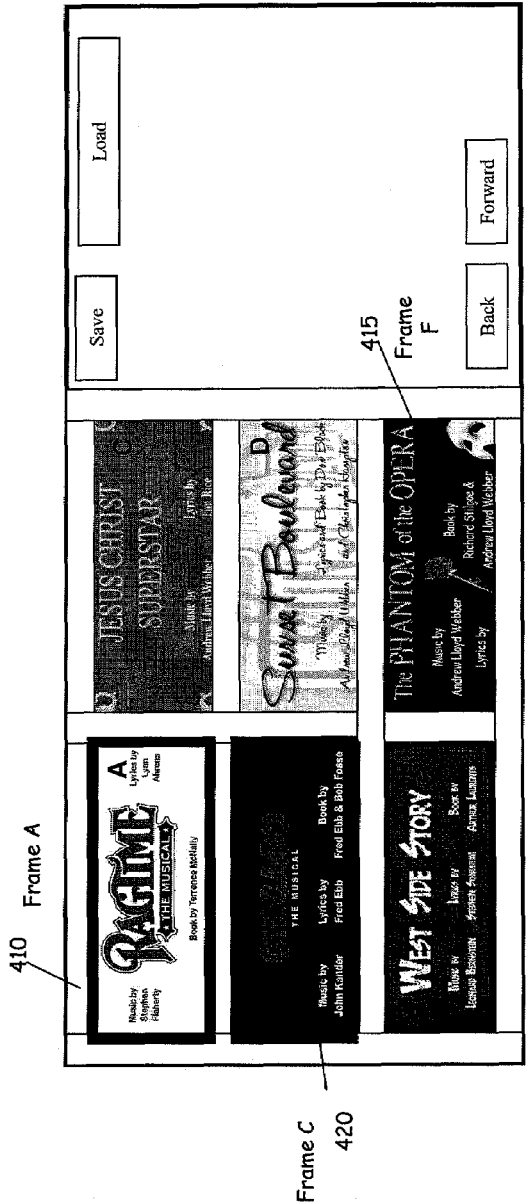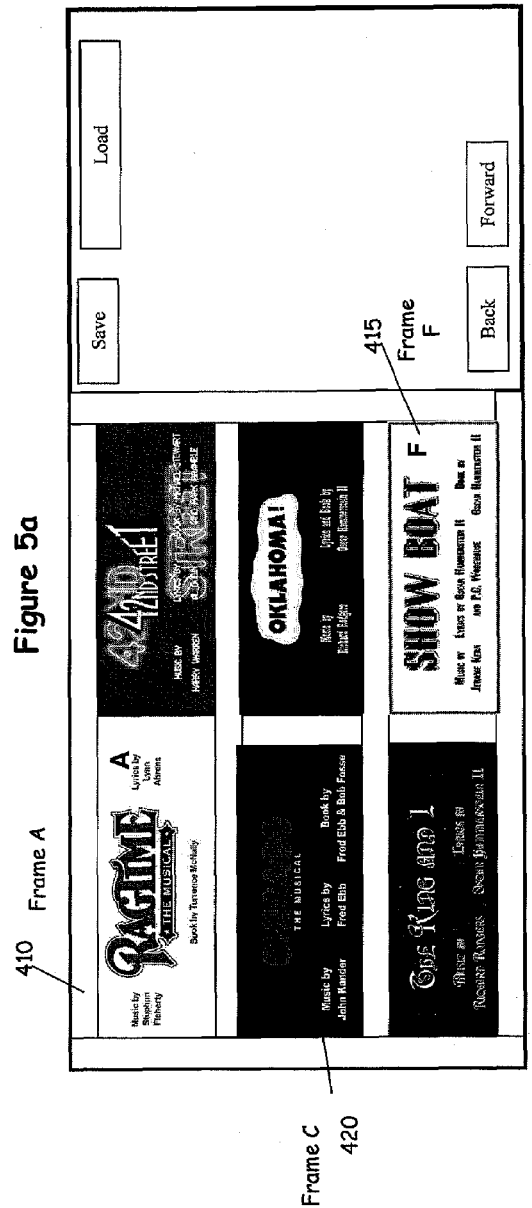
Figure 5a
Figure 5b

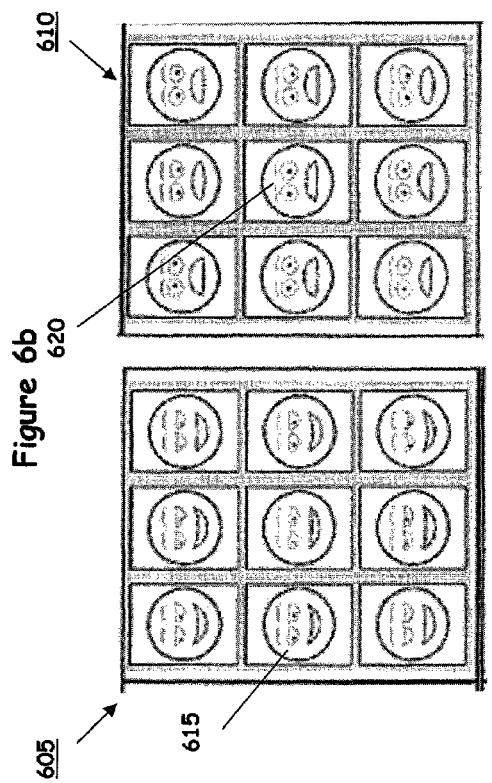
Figure 6a
Figure 6b
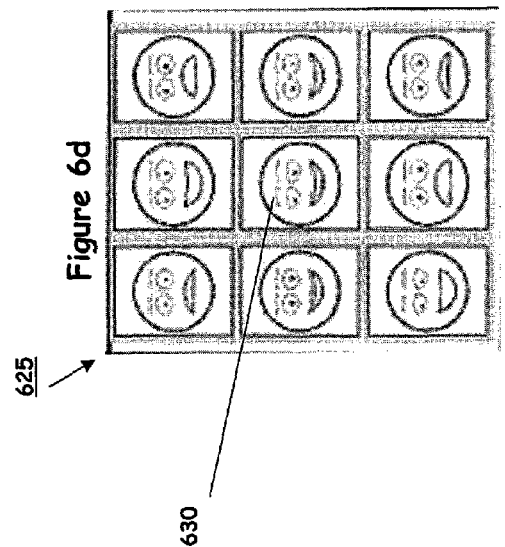
Figure 6d
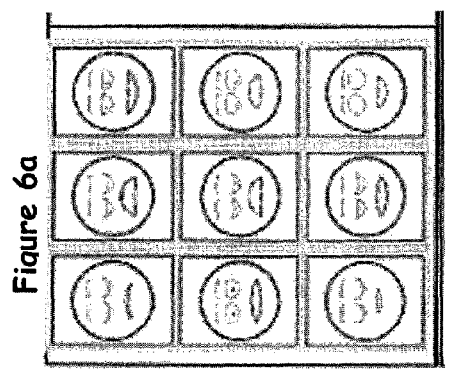
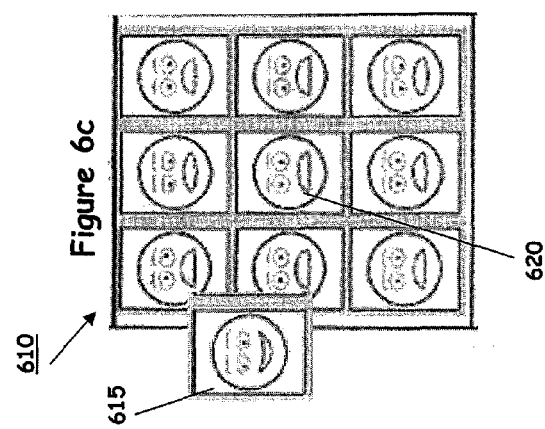
Figure 6c

METHODS AND APPARATUS FOR INTERACTIVE SEARCHING TECHNIQUES

INCORPORATION BY REFERENCE

The present application incorporates by reference the commonly-owned U.S. patent application Ser. No. 11/176,968, filed on Jul. 6, 2005, entitled "Method and Apparatus for Interactive Searching"; U.S. Provisional Patent Application Ser. No. 60/585,807, filed on Jul. 6, 2004, entitled "Methods and Systems for Interactive Searching"; and U.S. Provisional Patent Application Ser. No. 60/721,637, filed on Sep. 29, 2005, entitled "Methods and Apparatus for Interactive Searching Techniques."

FIELD OF THE DISCLOSURE

The disclosed methods and apparatus systems relate generally to searching for information from a database or other collection of materials.

BACKGROUND

Search engines may assist a user in identifying information that may be stored on a computer server or other information storage media. Generally, the information may be stored in the form of an entry or entries in a database (e.g., any structured database, any database of objects with tags or descriptors). The information may include, for example, various web page content, photographs, goods or services for sale, or any other item that can be represented and stored in electronic format. Some examples of commonly used search engines include, but are not limited to Yahoo®, MSN®, Google™, amazon.com®, a9.com, AOL®, Lycos®, LookSmart®, Altavista™, Ask Jeeves®, Orbitz™, Travelocity®, expedia.com®, and flickr™.

Search engines typically require the user to enter one or a plurality of keywords, and in some cases, to specify one or a plurality of Boolean operators to determine the logical relationship between the pluralities of keywords. This provision of one or more keywords and/or optional Boolean operators is referred to as the "search query." A search engine may execute one or more algorithms which may act on the search query to identify one or a plurality of items of information that may satisfy the search query (this information is commonly referred to as "search results"). The search engine generally returns the results of the search algorithm by presenting them to the user through some form of a user interface (e.g. display). In some instances, when a plurality of search results is available, the search engine may further determine which specific results to present to the user according to some criteria (e.g. ranking, optimization). The user typically is then able to select one or a plurality of search results. If none of the results is satisfactory, or if additional results are sought, the user can select to view additional results, or the user can refine or modify the search query, for example, by adding or removing one or more keywords and/or optional Boolean operators.

In addition to conventional search engines, which may execute various proprietary algorithms to process search queries and provide results according to some type of ranking or optimization process, a search query may be executed by a web directory service. Unlike a search engine, a web directory service that is capable of processing a search query typically returns to the user lists and categories of web sites, as search results, without necessarily ranking, promoting or optimizing the list of web sites. One example of a web directory service includes the Open Directory Project, hosted and administered by Netscape Communication Corporation.

SUMMARY

One embodiment of a search method and system comprises A) causing a first information set to be generated, comprising a first plurality of items, wherein each item of the first plurality of items is associated with at least one characteristic; B) representing at least some of the first information set in a first presentation; C) receiving a first feedback based upon the first presentation from a user; D) applying an evolutionary algorithm to generate a first search query, wherein the evolutionary algorithm is based on the first feedback; E) causing the first search query to be executed to generate a second information set comprising a second plurality of items, wherein each item of the second plurality of items is associated with at least one characteristic; F) representing at least some of the second information set in a second presentation; G) in response to a user input, repeating step B and representing at least some of the first information set in the first presentation; H) receiving a second feedback based upon the second presentation from a user; I) applying an evolutionary algorithm to generate a second search query, wherein the evolutionary algorithm is based on the second feedback; J) causing the second search query to be executed to generate a third information set comprising a third plurality of items, wherein each item of the third plurality of items is associated with at least one characteristic; and K) representing at least some of the third information set in a third presentation.

In some embodiments, the first feedback comprises a subjective value for at least one item of the first plurality of items, a subjective ranking for at least one item of the first plurality of items, a selection of at least one item of the first plurality of items, or a rejection of at least one item of the first plurality of items. In some embodiments, the subjective value was selected from a range of possible subjective values. In some embodiments, the first feedback comprises subjective values for at least two items of the first plurality of items, and the evolutionary algorithm generating the first search query is based on at least the said subjective values.

In some embodiments, the first information set, the second information set and the third information set each comprise a plurality of images or diagrams. In some embodiments, at least some of the first information set is displayed graphically as a grid of images and/or diagrams in the first presentation, at least some of the second information set is displayed graphically as a grid of images and/or diagrams in the second presentation, and at least some of the third information set is displayed graphically as a grid of images and/or diagrams in the third presentation.

In some embodiments, the first plurality of items comprises a plurality of goods for purchase and/or a plurality of services for purchase.

In some embodiments, the first search query and the second search query each are executed by a search engine. In some embodiments, the search engine is independently provided. In some embodiments, the first search query and the second search query each are executed by a web directory service. In some embodiments, the web directory service is independently provided.

In some embodiments, the at least one characteristic associated with at least one item of at least one plurality of items comprises a descriptor made available by a search engine or web directory service. In some embodiments, the at least one characteristic associated with at least one item of at least one plurality of items comprises a tag. In some embodiments, the tag comprises at least one of a keyword, a comment, a URL link and XML information. In some embodiments, the at least one characteristic associated with at least one item of at least one plurality of items comprises: a keyword; a classification-oriented identifier; a categorization-oriented identifier; or a semantic web-oriented identifier. In some embodiments, the at least one characteristic associated with at least one item of at least one plurality of items comprises: a taxonomy-related identifier; an ontology-related identifier; or a folksonomy-related identifier.

In some embodiments, the evolutionary algorithm includes at least one of the following genetic operators: a selection operator; a mutation operator; a recombination operator; a crossover operator; a directed operator; a constraint operator; or a preservation operator. In some embodiments, the evolutionary algorithm comprises a mutation operator configured to delete at least one gene of a genetic string and/or to add at least one random gene to a genetic string, and wherein applying the evolutionary algorithm to generate a first search query comprises applying the mutation operator to a genetic string associated with at least one item of the first plurality of items to generate the first search query. In some embodiments, the evolutionary algorithm comprises a crossover operator configured to combine genes of two genetic strings to produce at least one offspring, and a mutation operator configured to delete at least one gene of a genetic string and/or add at least one random gene to a genetic string, and applying the evolutionary algorithm to generate a first search query comprises: applying the crossover operator to genetic strings respectively associated with at least two items of the first plurality of items to generate at least one offspring; and applying the mutation operator to at least one genetic string associated with at least one of the at least two items of the first plurality of items, or to at least one offspring.

Some embodiments further comprise receiving from the user modifications of at least one of the first search query and the second search query prior to causing the said search query to be executed.

Some embodiments further comprise L) receiving from the user a selection of a first desired item from one of the plurality of items; M) receiving from the user a selection of a second desired item from another of the plurality of items; and O) generating a fourth search query based on the first desired item and the second desired item.

Some embodiments further comprise the first desired item from the presentation in which it was represented having been dragged into the presentation in which the second desired item was represented, and having been dropped onto the said second desired item.

In some embodiments, generating a fourth search query based on the first desired item and the second desired item comprises applying an evolutionary algorithm to a genetic string associated with the first desired item and a genetic string associated with the second desired item.

In some embodiments, causing a first information set comprising a first plurality of items to be generated comprises causing at least a portion of the first information set to be generated randomly. In some embodiments, causing a first information set comprising a first plurality of items to be generated comprises causing a search query to be executed Another embodiment of a search method and system comprises A) causing a first search query to be executed to generate a first information set comprising a first plurality of items, wherein each item of the first plurality of items is associated with at least one characteristic; B) representing at least some of the first information set in a first presentation; C) causing a second search query to be executed to generate a second information set comprising a second plurality of items, wherein each item of the second plurality of items is associated with at least one characteristic; D) representing at least some of the second information set in a second presentation; E) receiving from a user a selection of a first desired item from the first plurality items; F) receiving from a user a selection of a second desired item from the second plurality of items; and G) generating a third search query based on the combination of the first desired item and the second desired item.

Some embodiments further comprise the first desired item having been dragged from the first presentation into the second presentation, and dropped onto the second desired item in the second presentation.

In some embodiments, generating a third search query based on the first desired item and the second desired item comprises applying an evolutionary algorithm to a genetic string associated with the first desired item and a genetic string associated with the second desired item.

In some embodiments, the first search query and the second search query each are executed by a search engine. In some embodiments, the first search query and the second search query each are executed by a web directory service.

In some embodiments, the first plurality of items and the second plurality of items comprise a plurality of goods for purchase and/or a plurality of services for purchase.

In some embodiments, the first information set and the second information set each comprise a plurality of images or diagrams. In some embodiments, at least some of the first information set is displayed graphically as a grid of images and/or diagrams in the first presentation, and at least some of the second information set is displayed graphically as a grid of images and/or diagrams in the second presentation.

In some embodiments, the at least one characteristic associated with at least one item of at least one plurality of items comprises a descriptor made available by a search engine or web directory service. In some embodiments, the at least one characteristic associated with at least one item of at least one plurality of items comprises a tag.

In some embodiments, the evolutionary algorithm comprises a crossover operator configured to combine genes of two genetic strings to produce at least one offspring, and a mutation operator configured to delete at least one gene of a genetic string and/or add at least one random gene to a genetic string, and applying the evolutionary algorithm to generate a third search query comprises: applying the crossover operator to genetic strings respectively associated with the first desired item and the second desired item to generate at least one offspring; and applying the mutation operator to at least one of the genetic string associated with the first desired item, the genetic string associated with the second desired item, and the genetic string associated with the at least one offspring.

Another embodiment of a search method and system comprises A) causing a first search query to be executed to generate a first information set comprising a first plurality of items, wherein each item of the first plurality of items is associated with at least one characteristic; B) representing at least some of the first information set in a first presentation; C) in response to a user input, saving at least one item of the first plurality of items in a location specified by the user; D) causing a second search query to be executed to generate a second information set comprising a second plurality of items, wherein each item of the second plurality of items is associated with at least one characteristic; E) representing at least some of the second information set in a second presentation; F) in response to a user input, retrieving at least one saved item of the first plurality of items; and G) generating a third search query based on a combination of the at least one saved item of the first plurality of items and at least one of the second plurality of items.

Some embodiments further comprise the at least one saved item having been dragged from the first presentation into the specified location, and dropped onto the specified location.

In some embodiments, generating a third search query based on the at least one saved item and at least one of the second plurality of items comprises applying an evolutionary algorithm to a genetic string associated with the at least one saved item and a genetic string associated with at least one of the second plurality of items. In some embodiments, the evolutionary algorithm comprises a cross-over operator configured to combine genes of two genetic strings to produce at least one offspring, and a mutation operator configured to delete at least one gene of a genetic string and/or add at least one random gene to a genetic string, and wherein applying the evolutionary algorithm to generate a third search query comprises: applying the crossover operator to genetic strings respectively associated with the at least one saved item and at least one of the second plurality of items to generate at least one offspring; and applying the mutation operator to at least one of the genetic string associated with the at least one saved item, the genetic string associated with at least one of the second plurality of items, and the genetic string associated with the at least one offspring.

In some embodiments, the first search query, the second search query and the third search query each are executed by a search engine. In some embodiments, the first search query, the second search query and the third search query each are executed by a web directory service.

In some embodiments, the first plurality of items and the second plurality of items comprise a plurality of goods for purchase and/or a plurality of services for purchase.

In some embodiments, the first information set and the second information set each comprise a plurality of images or diagrams. In some embodiments, at least some of the first information set is displayed graphically as a grid of images and/or diagrams in the first presentation, and at least some of the second information set is displayed graphically as a grid of images and/or diagrams in the second presentation.

In some embodiments, the at least one characteristic associated with at least one item of at least one plurality of items comprises a descriptor made available by a search engine or web directory service. In some embodiments, the at least one characteristic associated with at least one item of at least one plurality of items comprises a tag.

BRIEF DESCRIPTION OF THE DRAWINGS

FIGS. 4a and 4b provide illustrations of some of the concepts discussed in connection with FIGS. 1 and 2, according to another embodiment of the present disclosure.

FIGS. 5a and 5b provide illustrations of some of the concepts discussed in connection with FIGS. 1 and 2, according to another embodiment of the present disclosure.

FIGS. 6a, 6b, 6c and 6d provide illustrations of a forking technique and a drag-drop technique according to other embodiments of the present disclosure.

DETAILED DESCRIPTION

To provide an overall understanding, certain illustrative embodiments will now be described; however, it will be understood by one of ordinary skill in the art that the apparatus and methods described herein can be adapted and modified to provide apparatus and methods for other suitable applications and that other additions and modifications can be made without departing from the scope of the systems and methods described herein.

Unless otherwise specified, the illustrated embodiments can be understood as providing exemplary features of varying detail of certain embodiments. Therefore, unless otherwise specified, features, components, modules, and/or aspects of the illustrations can be otherwise combined, separated, interchanged, and/or rearranged without departing from the disclosed systems or methods.

Interactive search is a way of presenting information to a user and letting the user provide feedback to improve the quality of the search until a desirable item is found. Interactive search differs fundamentally from other search methods in that it is geared toward searches in which the user does not exactly know what he is looking for, or when a normal search may return a vast number of items. In both of these circumstances, Applicants have recognized and appreciated that identifying the specific item(s) of interest to the user may be facilitated by an evaluation of the user's subjective preferences.

Figure 1:
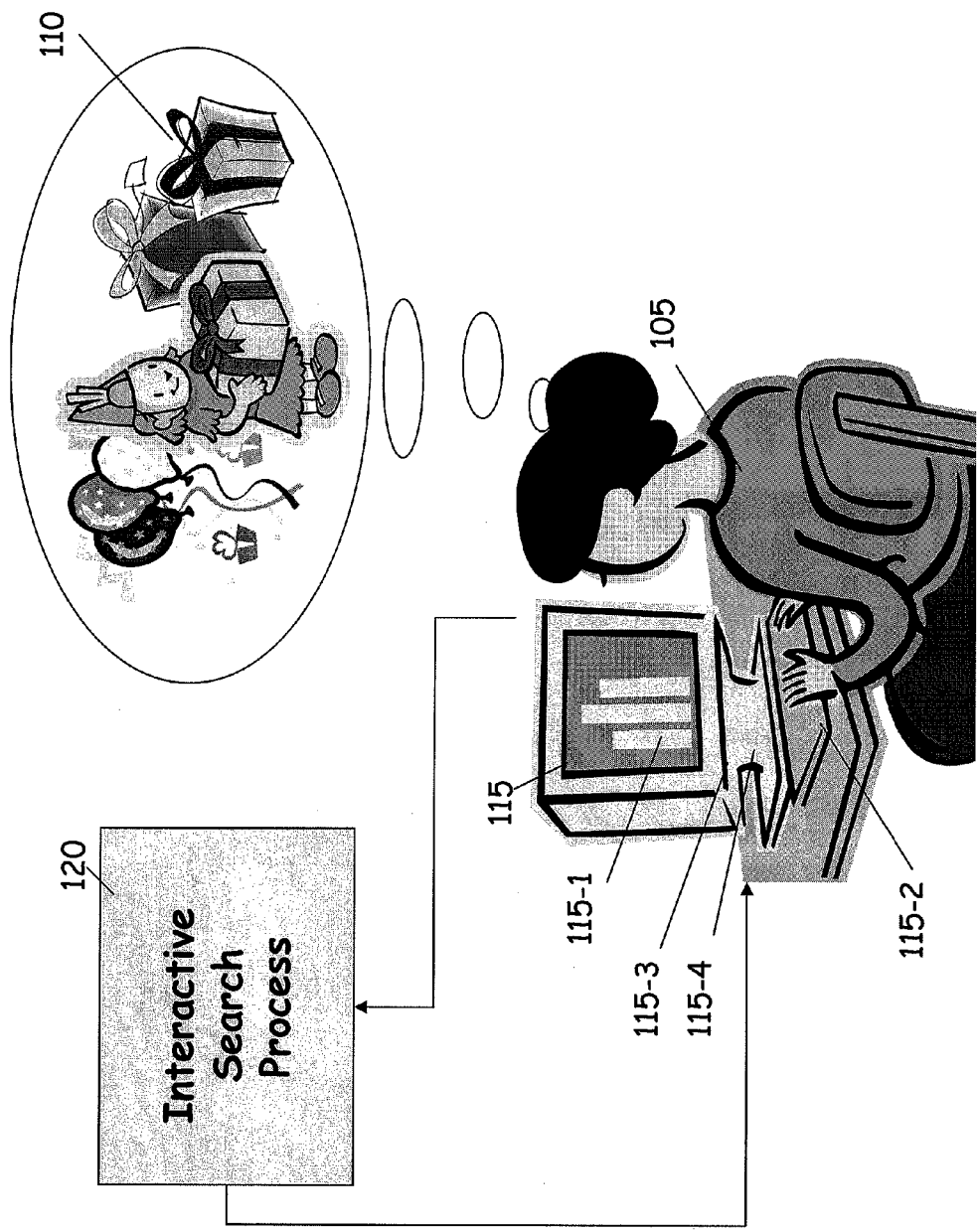
FIG. 1 is an overview of a user performing an interactive search process, according to one embodiment of the present disclosure.

One exemplary embodiment of the disclosed methods and apparatus is described in overview in FIG. 1. In this embodiment, a user 105 wishes to purchase a gift 110, but does not have a specific gift in mind. The user may employ a computer 115, including a display 115-1, a selection device 115-2 (e.g., a keyboard or a mouse), and one or more processors 115-3, to initiate a search query via a search component (e.g., a search engine or web directory service), which then presents to the user information regarding gift items, pursuant to the search query. In one aspect, since it is assumed the user does not have specific gift criteria in mind, the initial search query may indeed by quite crude or vague (e.g., the query might be based on the gender and/or age of the person for whom the gift it intended). Alternatively, the information regarding potential gift items may be generated randomly, for example, from a merchant's database, and/or the information may be selected. The user 105 then employs an interactive search process 120, as discussed in greater detail below, to actively evaluate her search options in accordance with her subjective preferences. She continues using the interactive search process 120 until she finds a desired gift item.

It should be appreciated that although the exemplary process depicted in FIG. 1 illustrates the selection of a gift, virtually any type of item identified in some manner in a searchable database may be searched for by the user in a similar interactive manner, according to various embodiments of the present disclosure.

Figure 2:
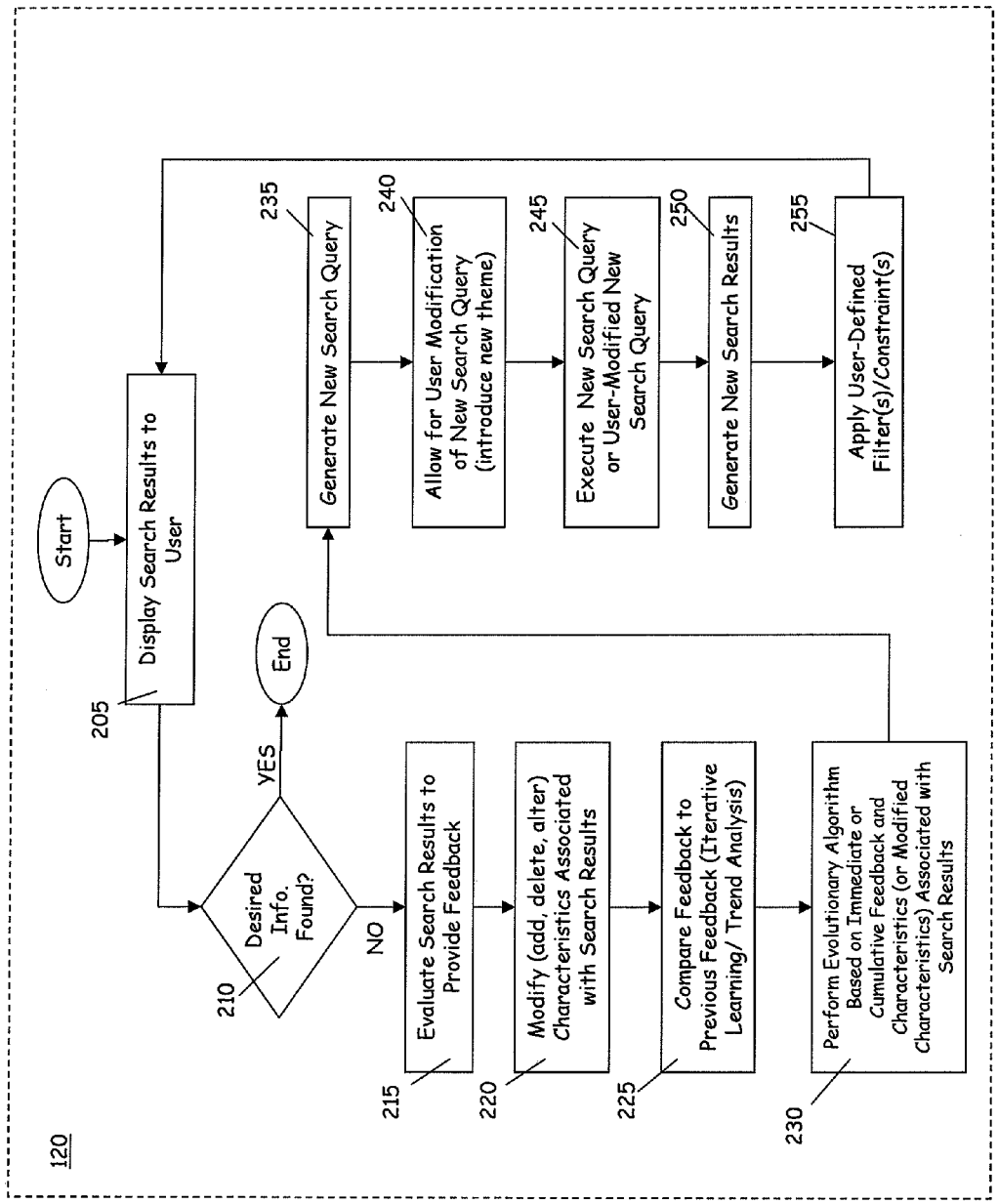
FIG. 2 is a flow diagram of the interactive search process indicated in FIG. 1, according to one embodiment of the present disclosure.

FIG. 2 illustrates in somewhat greater detail the interactive search process 120 indicated in FIG. 1, according to one embodiment of the present disclosure. As discussed further below, the process outlined in FIG. 2 includes some optional steps or acts that are not necessarily required in all embodiments of the present disclosure. Thus, the description below should be understood as including various concepts that may be optionally included in different implementations of methods and apparatus according to the present disclosure.

In the embodiment illustrated in FIG. 2, the interactive search process 120 begins in block 205 by displaying search results to the user 105 shown in FIG. 1. In one aspect of this embodiment, the search results may be randomly generated. In other aspects, a search component may execute a previous search query to generate the search results. Examples of such search components include, but are not limited to, Yahoo!®, MSN®, Google™, amazon.com®, a9.com, AOL®, Lycos®, LookSmart®, Altavista™, Ask Jeeves®, Orbitz™, Travelocity®, expedia.com®, flickr™, and the Open Directory Project.

In another embodiment not specifically depicted in FIG. 2, an interactive search process may more generally provide information relating to initial search results by representing all or a portion of the information as any one of a number of perceivable indications to the user 105. For example, all or a portion of the information relating to the search results may be provided as one or more audible or visible indications. With respect to visual indications, as indicated in block 205 of FIG. 2, all or a portion of the information may be displayed textually and/or graphically, including graphic displays of a plurality of images or diagrams representing respective items of information (e.g., individual items in the search results). In one exemplary implementation discussed further below, respective items in the search results may be graphically displayed to the user as a two dimensional grid of images or diagrams representing the items.

In block 210 of FIG. 2, the user decides whether the initial search results provided in block 205 contain desired information (e.g., a desired item in the search results). If so, the user can opt to end the process. Otherwise, the user may continue the process in block 215.

In block 215 of FIG. 2, the user is permitted to evaluate the search results to provide feedback. In one exemplary implementation, the user may evaluate the search results, for example, by utilizing a mouse, keyboard or other selection device in combination with evaluation options presented to the user via a computer display. In one aspect, the user feedback may include assigning a degree of randomness, based on evaluating a plurality of items in the search results, for generating a new search query according to subsequent acts in the process detailed below. In another aspect, the user feedback may include assigning a subjective value (also referred to as a "fitness" measure, or weight, or grade, or rank) to one or more items in the search results. In one exemplary implementation, one or more subjective values assigned by the user may be represented in some fashion on the display, in coordination with a representation of an item to which the subjective value is assigned. For example, in one embodiment, items of the search results may be graphically displayed as a two dimensional grid of images or diagrams, and subjective values assigned to different item may be respectively represented in some fashion on the grid of images or diagrams.

In other aspects, the user may select a subjective value from at least two or more possible subjective values to indicate the relative desirability of a given item in the search results. For example, by merely selecting (highlighting) a given item, the user may indicate that item's desirability. Non-selected (non-highlighted) items may then be considered as undesirable. In another aspect, the user may assign a positive value to desirable items, a negative value to undesirable items, and one or more items not particularly addressed by the user may be assigned a neutral value. In yet another aspect, the user may assign a subjective value for a given item from within a range of possible values between some minimum value and some maximum value (e.g., a degree of fitness, weight, grade or rank). In yet another aspect, a subjective value for one or more items may be assigned based on a user's response time to comment on a given item. The forgoing examples are provided primarily for purposes of illustration, and are not intended as limiting. Additionally, as discussed above, various options for assigning a subjective value to one or more items in the search results may be facilitated via the use of a computer display and/or selection device (e.g., keyboard, mouse).

In block 220 of the interactive search process illustrated in FIG. 2, the user may be given the option to modify (e.g., add, delete, alter) one or more characteristics associated with the search results. In one embodiment, each item in the search results may be associated with one or more characteristics. In one aspect, one or more characteristics associated with each item may include any descriptor for the item made available via a given search component's application program interface (API). Examples of such characteristics associated with a given item in the search results may include, but are not limited to, one or more tags (which may include one or more keywords, comments, URL links, and/or XML information), one or more classification-oriented identifiers, one or more categorization-oriented identifiers, and one or more semantic web-based identifiers. More specifically, one or more characteristics associated with a given item may include one or more taxonomy-related identifiers for the item, one or more ontology-related identifiers, and/or one or more folksonomy-related identifiers (e.g., "people who bought book X also bought book Y") (the terms "taxonomy," "ontology," and "folksonomy" are intended to have the respective meanings that would be readily associated with them by one of ordinary skill in the relevant arts).

In block 225 of FIG. 2, the process may optionally compare the present feedback provided by the user to previous feedback provided by the user, assuming that the interactive search process 120 shown in FIG. 2 has completed at least one loop of iteration. By optionally memorizing previous feedback, the process 120 may employ adaptive learning techniques (e.g., trend analysis) to ultimately shape the generation of a new search query. In one aspect of an implementation employing such adaptive learning techniques, one or more subjective values assigned by the user to one or more corresponding items in the search results may be modified prior to further processing (e.g., averaging subjective values from feedback gathered over multiple iterations, weighted averaging of subjective values, etc.).

In block 230 of the process 120 shown in FIG. 2, one or more evolutionary algorithms are performed based on the immediate user feedback (e.g., one or more subjective values assigned in block 215), or cumulative feedback provided by block 225. Again, the subjective value(s) constituting the user feedback may be viewed in terms of assigning a "fitness" measure or desirability in connection with one or more items in the initial search results.

In one embodiment, to facilitate the execution of one or more evolutionary algorithms in block 230, one or more characteristics associated with each item, or one or more characteristics that have been modified by a user (as discussed above in connection with block 220), are encoded as one or more "genes" in a genetic string associated with each item. Hence, each item in the search results may be associated with a corresponding genetic string that includes one or more genes, wherein each gene represents a characteristic of the item (e.g., a tag, keyword, comment, identifier, descriptor, attribute, etc., as discussed above).

In block 230, once one or more such genetic strings are assembled, the evolutionary algorithm including one or more genetic operators is then applied to the one or more genetic strings associated with one or more items. Genetic strings are considered in the evolutionary algorithm based on their corresponding "fitness," i.e., the user feedback (subjective value) assigned to the one or more items with which the strings are associated, to generate a new search query in block 235.

In various aspects, the genetic operators applied by an evolutionary algorithm in block 230 may include, but are not limited to, a selection operator, a mutation operator, a recombination operator, a crossover operator, a directed operator, a constraint operator, and a preservation (elitism) operator. For purposes of the present disclosure, and as would be readily understood by one of ordinary skill in the relevant arts, an evolutionary algorithm (also referred to as a genetic algorithm or program) generally is concerned with three possible factors, namely: 1) a population of one or more "parents" that may be randomly initialized (e.g., in the process 120, a "parent" may be considered as a genetic string associated with a given item in the search results); 2) one or more mutation operators capable of altering at least one "parent" to a "neighboring solution" (this process also may be referred to as a "local search operator"); and 3) a recombination operator which can recombine genetic strings of two parents into a "child" that inherits traits from both parents (this process also may be referred to as a "global search operator").

In connection with evolutionary algorithms as applied herein, an exemplary mutation operation may be generally understood to potentially introduce randomness to the process, as a mutation operator may be configured to delete one or more genes of a given genetic string, or add one or more random genes to a given genetic string. Exemplary recombination operations can include reproduction, mutation, preservation (e.g., elitism) and/or crossover, where crossover can be understood to be the combination of two individuals (the "parents") to produce one or more offspring (the "children") (i.e., a crossover operator may be configured to combine genes of at least two given genetic strings to produce one or more offspring). Those of ordinary skill will recognize that a crossover operator may include asexual crossover and/or single-child crossover. Accordingly, crossover can be more generally understood to provide genetic material from a previous generation to a subsequent generation. In one exemplary evolutionary algorithm that may be employed in an implementation of the process 120 shown in FIG. 2, at least one crossover operator is applied to at least two genetic strings respectively associated with two items in the search results to generate an offspring, and at least one mutation operator is subsequently applied to the offspring to generate a new search query.

Variations of evolutionary algorithms, and different genetic operators used in various combinations, several of which are suitable for the process 120 shown in FIG. 2, are well known in the art. Accordingly, the examples presented herein are discussed primarily for purposes of illustration, and are not intended as limiting. In some exemplary implementations, one or more evolutionary algorithms are designed a priori to act on one or more genetic strings, and may not be altered by the user. In other implementations, the user may be provided with the capability to design their own evolutionary algorithm by selecting one or more genetic operators to apply to one or more genetic strings input to the algorithm, as well as an execution sequence for multiple genetic operators. The user's interaction with the process 120 then may include evaluation of fitness for a particular item, modification of one or more of an item's characteristics (genes) and evolutionary algorithm design.

As discussed above, in block 235 of FIG. 2, a new search query is generated by one or more evolutionary algorithms. As indicated in block 240, in one exemplary implementation the user optionally may be allowed to modify the new search query to introduce a new theme (e.g., one or more new search terms) not present in the generated search query. In one aspect of this implementation, the new search query generated by the one or more evolutionary algorithms would be displayed to the user (e.g., via a computer display) for modification.

In block 245 of the process 120 outlined in FIG. 2, the new search query generated in block 235, or a user-modified new search query optionally provided in block 240, is executed by a search component (e.g., search engine or web directory service), and new search results are generated in block 250. In one exemplary implementation, the same search component that was employed to initially generate search results in block 205 is again employed to execute a search query in block 245. In one aspect, the new search query or user-modified new search query may be passed to the search component via the search component's application programming interface (API).

Once new search results are generated in block 250, block 255 indicates that the user optionally may define a filter that is applied to the newly generated results. For example, in one exemplary implementation, the user may define one or more constraints (e.g., provide only those results that cost less than $100, provide only green items, provide only 10 items) to selectively filter out possibly undesirable results from the newly generated results.

As indicated in FIG. 2, the unfiltered results generated in block 250, or the optionally filtered results generated in block 255, are then displayed in block 205 as the process 120 returns to the beginning for another iteration. For example, the user may subsequently evaluate the newly generated unfiltered or filtered search results in block 215 to provide new feedback, and optionally modify one or more characteristics (genes) associated with a given item in the new search results, as indicated in block 220. Furthermore, now that at least one iteration of the process has been completed, the adaptive learning or trend analysis feature indicated in block 225 may be utilized based on comparing present user feedback to previous user feedback, and one or more evolutionary algorithms again may be performed in block 230, based on present (immediate) or cumulative feedback, and modified or unmodified genes associated with the new search results.

With reference again to FIG. 1, the interactive search process 120 discussed above in connection with FIG. 2 may, in one embodiment, be implemented with the aid of a conventional computer 115 (e.g., a personal computer, laptop, etc.) that includes a display 115-1 configured to convey information (e.g., search results) to the user 105, one or more selection devices 115-2 (e.g., a keyboard and/or mouse) configured to permit the user to interact with the process (e.g., evaluate the search results, modify genes, define filters or constraints), and one or more processors 115-3 configured to implement various steps or acts of the interactive search process 120.

In one exemplary implementation, the computer 115 includes a computer-readable medium 115-4 (e.g., various types of memory, compact disk, floppy disk, etc.) having computer-readable signals stored thereon that define instructions which, as a result of being executed by the one or more processors of the computer, instruct the computer to perform various steps or acts of the interactive search process 120. In another implementation, the interactive search process 120 is configured to "sit on top of" a conventional search component invoked by the user of the computer, by obtaining one or more characteristics or "genes" associated with a given item of information via the search component's API, and providing new search queries to the search component via its API.

According to various embodiments, the user may interact with the search process 120 via a number of possible techniques involving the display 115-1 and one or more selection devices 115-2. For example, as discussed above, information representing search results may be displayed on the display 115-1 in a variety of textual and/or graphical (e.g., iconic) formats. The user may utilize one or both of the display 115-1 and one or more of the selection devices 115-2 to click on/select/highlight various items of displayed information to provide some type of user feedback (e.g., assignment of subjective value to an item).

In one exemplary embodiment in which respective items of information are represented as images or diagrams surrounded by a border, a user may click on an item to change its evaluation between neutral (e.g., no border), positive (e.g., grey or some other color border) or negative (e.g., crossed out). In another embodiment, the user may obtain additional information about a particular item (e.g., characteristics or genes associated with the item) by letting a cursor hover over the image or diagram corresponding to the item or right clicking over the image or diagram corresponding to the item, for example. In yet another embodiment, an image or diagram corresponding to one or more items may be associated with a small slider, entry box, or pull-down/drop-down box, etc., displayed near or over the image or diagram. In the example of a slider, the user may adjust the slider with one of the selection devices to assign a subjective value to the item within a range of values from some minimum value to some maximum value represented on the slider. In the example of an entry box or pull-down/drop-down box, the user may manually enter a value from the keyboard, or select a value from amongst multiple possibilities conveyed by a menu. In yet another embodiment, the user may select a degree of randomness in generating new search queries through a slider representing two extremes labeled "Guide Me" and "Surprise Me," corresponding respectively to low and high degrees of randomness. It should be appreciated that the foregoing examples are provided primarily for purposes of illustration, and that various embodiments of the present disclosure are not necessarily limited in these respects.

Figure 3C:
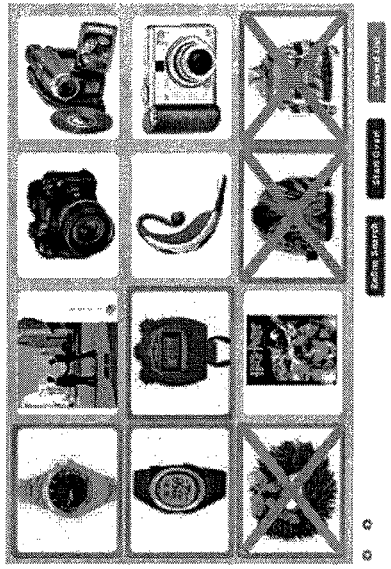
FIGS. 3a, 3b, 3C and 3d provide illustrations of some of the concepts discussed in connection with FIGS. 1, and 2, according to one embodiment of the present disclosure.
Figure 3D:
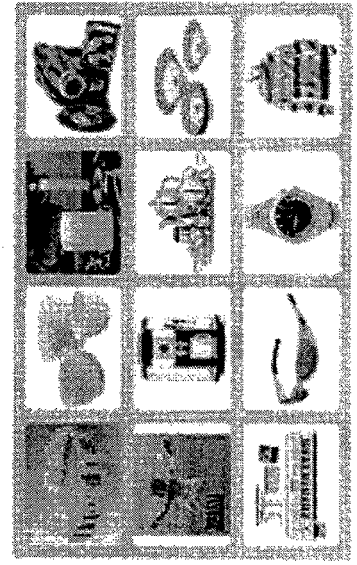
Figure 3A:
Figure 3B:
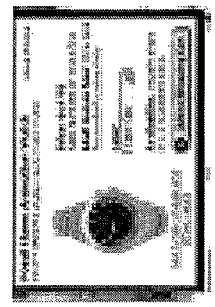

FIGS. 3*a*, 3*b* and 3*c* provide another illustrative embodiment of some of the concepts discussed above. FIG. 3*a* shows a set of items as a 4×3 grid, though other configurations are possible. The initial set of items may be generated by an initial search query. In FIG. 3*b*, the user may obtain additional information on any given item represented in the grid, such as price and availability, by letting the cursor hover over the item, and/or by right-clicking the item. In FIG. 3*c*, the user 105 can select, or click on, an particular item in order to change its evaluation between neutral (no border), positive (grey border) or negative (crossed out). FIG. 3*d* illustrates the results of a subsequent search query pursuant to the interactive search process 120, which may include the items selected by the user or similar items, but not include items indicated with a negative feedback by the user or similar items. The new search results also may include other random items the user has not seen, and/or other items similar to those the user has already seen but not evaluated. For example, in FIG. 3*c*, the user had given positive feedback to a watch and a camcorder, and negative feedback to an electronic keyboard and a set of dishes. The next selection in FIG. 3*d* includes additional watches and cameras, and additional items. In FIG. 3*c*, the user has given positive feedback to all the watches, and negative feedback to the clothes and the wreath, while leaving the camera equipment as neutral. By continuing in this fashion, the user will eventually converge on a specific item or set of items that is satisfactory.

Yet another exemplary embodiment implementing various concepts according to the present disclosure includes a web-based system that enables the user to select a venue for a vacation. When looking for a vacation, most Internet-bases search engines such as Orbitz™, Travelocity®, and expedia.com® can offer information about specific hotels, resorts, etc., but require the user to have a clear idea of (e.g., to specify) a destination. In many cases, a person looking for a vacation destination may only have an approximate idea of a destination/time, e.g., "I want to spend one week in January someplace warm with my husband and two children." With existing travel sites, the user has to select a geographical area, and look through a list of possible venues (e.g., selected on the basis of price range) to identify one with the desired characteristics. However, the user may initially have no idea of which particular geographical locations are satisfactory, and even if s/he has an idea of the geographical area (e.g., the Caribbean), s/he may not know which specific locations and which venues at that location satisfy her/his constraints.

Some online vacation sites allow a user to specify a number of criteria in a sequential fashion, for instance by starting with a specific location, then selecting price range, activity types, etc.; however, in this way, the search is narrowed unnecessarily and may cause a user to overlook some potentially suitable alternatives. For example, if a user begins by selecting the Caribbean, s/he may eventually identify a resort in Cancun, but there may have been other venues (e.g., Canary Islands) which have similar and perhaps more desirable characteristics, where such other venues which were not presented to the user after the initial decision.

In view of the foregoing, in one embodiment, the user is presented with a grid of images, each image being a picture representing one venue. Below each image may be a row of icons representing key characteristics of the property, such as cost, style (single, couple, family, . . . ), geographical location, etc. A second row below the image can include simple iconographic buttons that allow the user to obtain additional information in a pop-up window (e.g., view additional photos, read client reviews, determine availability), to provide evaluative feedback about the property (this can be as simple as a thumbs-up/thumbs-down pair, or a slider), to save this property to a folder representing the user's current selection portfolio, and/or to actually make a reservation at this property.

In one aspect of this embodiment, the display below the entire grid of images may include one or more buttons and sliders, including a button to generate a refined set of properties based on the user's feedback, a button to start with a fresh random set of properties, a slider labeled with the extreme values "Surprise me" and "Guide me" which determine the level of randomness of the search as described for the previous embodiment, a button that brings the user to her current portfolio of selections, and navigation buttons to trace backwards and forward through the selections made during a given search session.

In other aspects of this embodiment, an additional set of buttons, pull-down menus, radio buttons, and/or text entry boxes can be included. Through these various devices, the user can specify a filter, i.e., one or more constraints, that apply to all searched properties. For instance, if the user wants only family-oriented resorts by the sea, s/he can specify these criteria to ensure that inappropriate properties are not selected during search.

FIGS. 4 and 5 illustrate yet another exemplary embodiment of the present disclosure. In this embodiment, the interactive search process 120 discussed above in connection with FIG. 2 assists the user 105 to search for a music CD. For example, the user visits the Amazon.com website and searches under the CD section. Specifically, in this example, the user types "Broadway" in the search window and the Amazon search engine returns a selection 405 of search results, of which six are displayed in FIG. 4a.

Based on her personal preferences, the user selects Frame A 410 and Frame F 415 (as depicted by the striped frames). One or more evolutionary algorithms of the interactive search process 120 utilize the "genes" (e.g., tags) associated with the items in Frame A 410 and Frame F 415 and feed a new search query, based mutations and recombinations of the genes, into the Amazon search engine. The search engine generates a new population of search results (FIG. 4b) which presents CD options that combine implicit properties of Frame A 410 and Frame F 415. For example, the new population in FIG. 4b includes more musical selections by Andrew Lloyd Webber, the composer of the musical, namely Phantom of the Opera, in Frame F 415.

As shown in FIG. 4b, if the user so desires, she may right click on Frame C 420 and bring up a search box 425. The search box 425 allows the user to introduce a new theme to the search. In the illustrated embodiment, the user enters the new theme: "Chicago"; and then clicks an OK-button 430. A search based on the query "Chicago" is conducted for Frame C 420 and will be displayed on within Frame C 420.

FIG. 5a depicts Frame C 420 as being replaced with the musical "Chicago," which was the search result for the query "Chicago." The user can continue with the Interactive Search Process by selecting Frame A 410 and Frame C 420. This new search generates an offspring (e.g. mutation and recombination) that combines the genes (e.g., characteristics, tags) of these two new themes. As shown in FIG. 5b, the new search returns a new population, which results from the feeding of a search query based on mutated and recombined genes to the Amazon search engine. Oftentimes, these searches produce highly relevant combinations that the user typically may not have considered. One of the results, "Show Boat" (see Frame F 415) is an example of an usual but highly relevant combination of the musicals "Ragtime" and "Chicago."

According to one aspect, the embodiment illustrated in FIGS. 4 and 5 may employ two distinct modes of evolution: Hill Climbing (HC) and Mutation and Crossover (MC). In the HC mode, the user selects only one item displayed and the search consists of mutating one or more of the item's genes. Mutation consists of deleting part of the genetic string; adding one or more random genes to the genetic string; or replacing part of the genetic string. HC is used to fine tune the search. In the MC mode, the user can select several displayed items and crossover is applied to those items by combining genes of the items' respective genetic strings. The resulting offspring genetic string is then mutated. A new search query based on the foregoing is then fed into the Amazon search engine, which in turn, generates new search results. All or a subset of the new search results is displayed to the user.

The embodiment illustrated in FIGS. 4 and 5 was implemented by using Amazon's APIs to interface with their search engine. However, a person skilled in the art would know that the described methods and apparatus may be applied to any existing search engine with an interface, such as Yahoo!

FIG. 6 illustrates additional search techniques, namely a forking technique and a drag-drop technique, which may advantageously be employed in the course of a search process. FIG. 6a shows a set of facial expressions presented as a 3×3 grid, although other configurations are possible, and as with the other embodiments herein the technique is not limited to the specific search example illustrated, but may be applied to searches for any suitable item or information. As with the example of FIG. 3, for example, the set of items in FIG. 6a may be generated by an initial search query, either in a single iteration or by multiple iterations of the processes described above, or the set may be randomly generated as the start of a search process, or the set may be generated by any other appropriate method. After being presented with the set of choices shown in FIG. 6a, the user may have determined that she is undecided about the direction in which she wishes to have the search proceed, and accordingly may have chosen to "fork", or generate additional search queries from the results presented in FIG. 6a. These additional search queries are represented as separate windows, or displays, and may be manipulated independently from the initial search query. Thus, the forking technique advantageously allows the user to efficiently and simultaneously search along multiple avenues. For example, FIG. 6a illustrates a 3×3 grid of expressions which may have resulted from a prior search iteration or may have been randomly generated as an initial step in a search process. The user, in FIG. 6b, has forked from the initial display of FIG. 6a into two separate displays: a first display 605 and a second display 610. The user has chosen the features to be sought in each search fork by appropriate selection from the choices shown in FIG. 6a, and then has continued in each display window 605 and 610. Here, the first resulting display 605 represents a search process in which the user has sought to find facial expressions with big smiles, while the second resulting display 610 represents a search process in which the user has sought to find facial expressions with big eyes. (The specific set of facial expressions shown in resulting displays 605 and 610 may have resulted from a single search iteration from the display in FIG. 6a or from multiple iterations therefrom.) The user may decide to continue to pursue facial expressions with big eyes, and thus continue performing the steps of FIG. 2 on the second display 610. If she decides later on to pursue facial expressions with big smiles, she can easily revert to the first display 605 and perform the steps of FIG. 2 on that display. In addition, the user may return back to the initial display (FIG. 6a) to conduct more interactive searching, or use the forking technique to generate additional search displays.

A non-volatile memory storage device, such as an internal hard disk or semiconductor memory device, is associated with each search query, so that the user is able to return to previous generations for a search display by clicking on a "Back" button, or retrieving button, or other similar method known to persons of skill in the art.

In addition, the user may use a "drag-drop" technique in the search process (FIGS. 6b and 6c) to combine desired features or results from two forks of the search process. In the "drag-drop" technique, the user selects a first desired item 615 from the first display 605 and a second desired item 620 from the second display 610. Both desired items 615, 620 contain characteristics desired by the user. In the present example, the first desired item 615 contains a facial expression with a big smile (desired by the user) and the second desired item 620 contains a facial expression with big eyes (desired by the user). As shown in FIG. 6c, the user clicks and drags the first desired item 615 over to the second display 610. Holding the first desired item 615 over the second desired item 620, the user releases, or "drops", the first desired item 615 over the second desired item 620. As shown in FIG. 6d, the characteristics of the first desired item 615 combine with the characteristics of the second desired item 620 to generate a third display 625. The third display 625 provides various facial expressions having some combination of the two desired items 615, 620. In fact, a third desired item 630 contains both of the two desired characteristics: a big smile and big eyes. Of course, the user may desire to combine more than one characteristic of one or both of the desired items, and the search process may continue based upon the displayed results or may terminate.

In addition, the user may use a "goody bag" technique in the search process to save a potentially desired item from a display window displaying the results of a search iteration, for possible later use. In this technique, the user may use a "drag-drop" technique to place the potentially desired item in a location where it will be saved for possible further use, or may take some other indicated action to indicate that a particular item should be saved. If items have been saved in the "goody bag," then at a later time during the search process (or even on a later occasion such as but not limited to during another search process), the user may retrieve an item from a "goody bag," again using a drag-drop or other technique, and either place it back into a search display to be considered in a further iteration, or take some other action with respect to it (such as purchasing the item, if the search involved a search for a gift, for example). More than one "goody bag" may be created or utilized, to save items for different potential later uses. In addition, the "goody bag" technique may be used to store and retrieve other results from interactive evolutionary computing applications, in contexts other than database searches. As one example, the technique may be used in conjunction with the digital imaging application described below to save potentially interesting interim results for potential later retrieval. Numerous other applications also will be apparent.

The disclosed methods and systems can additionally be used to identify a set of parameters or characteristics rather than selecting one item out of an existing set of items. Consider for example the process of modifying a digital image. Programs such as PhotoShop or Paint Shop Pro provide the user with a large set of filters that alter the content of the image. For example, there are filters that can change contrast, brightness, tint, saturation and color balance. There are also many filters that apply artistic or geometric effects such as emboss, charcoal, paintbrush, leather, kaleidoscope, warp, solarize, mosaic, etc. Each of these filters typically is associated with one or more parameters that modify the extent or nature of the filter. For instance, FIG. 7a shows an original digital picture using Paint Shop Pro (v.7) to apply some artistic filters to the image. Paint Shop Pro (v.7) includes over 80 different filters, and many more third-party filters, with the ability to create user-defined filters. Of the 80 or so standard filters, most have multiple parameters that determine the strength and quality of the effect being applied. For instance, the "Rough Leather" effect is controlled by seven parameters: leather color, angle, luminance, contrast, sharpness, blur and light color. Each parameter admits many different values: if the colors are quantized to 16 bits (256 possible colors), the following number of settings for each parameter are achieved: leather color (256), angle (360), luminance (512), contrast (100), sharpness (100), blur (100) and light color (256). Accordingly, there are about $10^{16}$ possible combinations. Even if it is assumed that each parameter is only quantized to 16 values (4 bits), there are nearly 300 million combinations. Clearly, even if the user has decided to apply a single filter, it is impracticable to try even a small fraction of the possible variants of that filter. The complexity of the search grows exponentially if the user wants to apply multiple filters in sequence.

Figure 7B:
FIGS. 7a and 7b provide illustrations of some of the concepts discussed in connection with FIGS. 1, and 2, according to another embodiment of the present disclosure.
Figure 7A:
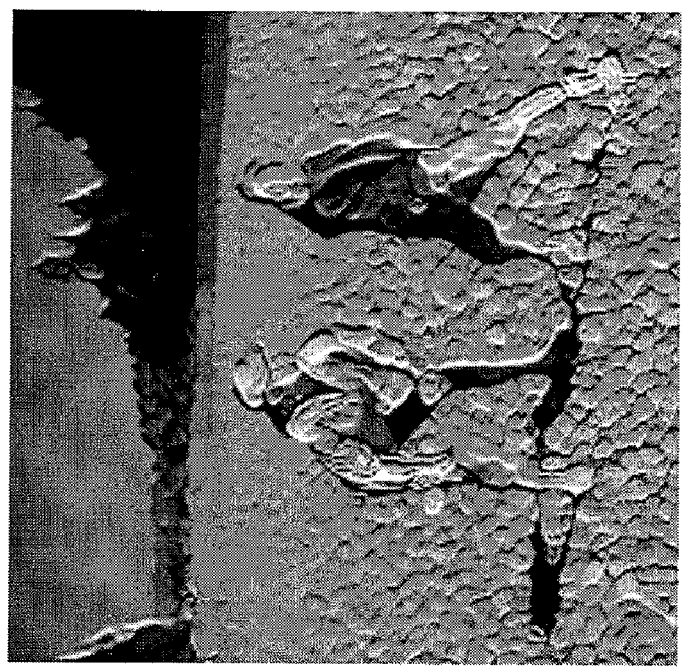

FIGS. 7a and 7b illustrate the impact of filters and their parameters. FIG. 7a shows an original image. All other panels are generated using the Rough Leather filter with different parameter settings. In all cases, the leather color (yellow) and the light color (white) remained unchanged, and the modified parameters included the angle (A), luminance (L), contrast (C), sharpness (S) and blur (B). The accompanying FIG. 7b thus illustrates that small changes in a subset of the parameters can yield dramatically different results. Specifically, the five parameters were set as follows: A=270; L=0; C=0; S=30; B=10. FIG. 1c: A=90; L=10; C=20; S=0; B=0. FIG. 1d: A=45; L=10; C=0; S=50; B=50.

Accordingly, the problem of selecting filters and parameters can be understood to be a search problem that requires an understanding of the user's subjective evaluation, and that has a potentially vast set of results, as provided herein.

Another embodiment of the disclosed methods and systems presents the user with a grid of images. Images in the grid are generated by applying a randomly chosen effect filter with a random set of parameters. A separate panel shows the original image for comparison. Each image in the grid is associated with a set of buttons and sliders that enable to user to provide feedback on his/her subjective evaluation of that image, a button that allows the user to manually adjust parameters using the current image as a starting point, and/or a button/interface that allows the user to save the image to a folder.

Below the entire grid of images, the example embodiment includes buttons and sliders, including a button to generate a new set of images based on the user's feedback, a button to start with a fresh random set of images, a slider which determines the level of randomness of the search as described for previous embodiments, and navigation buttons to trace backwards and forward through the selections made during a given search session.

In additional embodiments, the items being searched might include any of the following: homes, automobiles, financial instruments (such as stocks or bonds), service providers, legal documents, scientific articles, art, images, web pages, recruitment candidates, potential employers, etc., with such examples provided for illustration and not limitation. In the context of selecting parameters, as was shown in the embodiment for selecting parameters for image effect filters, additional embodiments can be envisioned for design of mechanical systems, architectural elements, artistic designs, etc. The above are meant as partial lists, as various embodiments can be applied to any search in which the results come from a potentially vast set of choices.

As used herein, a "user interface" is an interface between a human user and a computer that enables communication between the user and the computer. A user interface may include an auditory indicator such as a speaker, and/or a graphical user interface (GUI) including one or more displays. A user interface also may include one or more selection devices including a mouse, a keyboard, a keypad, a track ball, a microphone, a touch screen, a game controller (e.g., a joystick), etc., or any combinations thereof As used herein, an "application programming interface" or "API" is a set of one or more computer-readable instructions that provide access to one or more other sets of computer-readable instructions that define functions, so that such functions can be configured to be executed on a computer in conjunction with an application program, in some instances to communicate various data, parameters, and general information between two programs.

The various methods, acts thereof, and various embodiments and variations of these methods and acts, individually or in combination, may be defined by computer-readable signals tangibly embodied on one or more computer-readable media, for example, non-volatile recording media, integrated circuit memory elements, or a combination thereof Such signals may define instructions, for example, as part of one or more programs, that, as a result of being executed by a computer, instruct the computer to perform one or more of the methods or acts described herein, and/or various embodiments, variations and combination thereof Such instructions may be written in any of a plurality of programming languages or using any of a plurality of programming techniques.

For example, various methods according to the present disclosure may be programmed using an object-oriented programming language. Alternatively, functional, scripting, and/or logical programming languages may be used. Various aspects of the disclosure may be implemented in a non-programmed environment (e.g., documents created in HTML, XML or other format that, when viewed in a window of a browser program, render aspects of a graphical-user interface (GUI) or perform other functions). Various aspects of the disclosure may be implemented as programmed or nonprogrammed elements, or combinations thereof A given computer-readable medium may be transportable such that the instructions stored thereon can be loaded onto any computer system resource to implement various aspects of the present disclosure. In addition, it should be appreciated that the instructions stored on the computer-readable medium are not limited to instructions embodied as part of an application program running on a host computer. Rather, the instructions may be embodied as any type of computer code (e.g., software or microcode) that can be employed to program a processor to implement various aspects of the present disclosure.

Having thus described several illustrative embodiments, it is to be appreciated that various alterations, modifications, and improvements will readily occur to those skilled in the art. Such alterations, modifications, and improvements are intended to be part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Accordingly, the foregoing description and attached drawings are by way of example only, and are not intended to be limiting.

What is claimed is:

1. A search method, comprising:
    A) causing a first information set to be generated, comprising a first plurality of items, wherein each item of the first plurality of items is associated with at least one characteristic;
    B) representing at least some of the first information set in a first presentation;
    C) receiving a first feedback based upon the first presentation from a user;
    D) applying an evolutionary algorithm to a plurality of characteristics associated with the first plurality of items to generate a first search query, wherein the evolutionary algorithm is based on the first feedback;
    E) causing the first search query to be executed to generate a second information set comprising a second plurality of items, wherein each item of the second plurality of items is associated with at least one characteristic;
    F) representing at least some of the second information set in a second presentation;
    G) in response to a user input, repeating step B and representing at least some of the first information set in the first presentation;
    H) receiving a second feedback based upon the second presentation from a user;
    I) applying an evolutionary algorithm to a plurality of characteristics associated with the second plurality of items to generate a second search query, wherein the evolutionary algorithm is based on the second feedback;
    J) causing the second search query to be executed to generate a third information set comprising a third plurality of items, wherein each item of the third plurality of items is associated with at least one characteristic; and
    K) representing at least some of the third information set in a third presentation; wherein at least one characteristic associated with each item is chosen from a group comprising: at least one descriptor made available by a search engine or web directory service; at least one tag; at least one keyword; at least one classification-oriented identifier; at least one categorization-oriented identifier; and at least one semantic web-oriented identifier; and
wherein at least one characteristic associated with each item is not a word or phrase selected from text displayed as part of the item.

2. The method of claim 1, wherein the first feedback comprises a subjective value for at least one item of the first plurality of items.

3. The method of claim 1, wherein the first feedback comprises a subjective ranking for at least one item of the first plurality of items.

4. The method of claim 1, wherein the first feedback comprises a selection of at least one item of the first plurality of items.

5. The method of claim 1, wherein the first feedback comprises a rejection of at least one item of the first plurality of items.

6. The method of claim 1, wherein the first information set, the second information set and the third information set each comprise a plurality of images or diagrams.

7. The method of claim 6, wherein at least some of the first information set is displayed graphically as a grid of images and/or diagrams in the first presentation, at least some of the second information set is displayed graphically as a grid of images and/or diagrams in the second presentation, and at least some of the third information set is displayed graphically as a grid of images and/or diagrams in the third presentation.

8. The method of claim 1, wherein the first plurality of items comprises a plurality of goods for purchase and/or a plurality of services for purchase.

9. The method of claim 1, wherein the first search query and the second search query each are executed by the search engine.

10. The method of claim 9, wherein the search engine is independently provided.

11. The method of claim 1, wherein the first search query and the second search query each are executed by the web directory service.

12. The method of claim 11, wherein the web directory service is independently provided.

13. The method of claim 1, wherein the at least one characteristic associated with at least one item of at least one plurality of items comprises a descriptor made available by the search engine or web directory service.

14. The method of claim 1, wherein the at least one characteristic associated with at least one item of at least one plurality of items comprises a tag.

15. The method of claim 14 wherein the tag comprises at least one of a keyword, a comment, a URL link and XML information.

16. The method of claim 1, wherein the at least one characteristic associated with at least one item of at least one plurality of items comprises:
    a keyword;
    a classification-oriented identifier;
    a categorization-oriented identifier; or
    a semantic web-oriented identifier.

17. The method of claim 16, wherein the at least one characteristic associated with at least one item of at least one plurality of items comprises:
    a taxonomy-related identifier;
    an ontology-related identifier; or
    a folksonomy-related identifier.

18. The method of claim 1, wherein the evolutionary algorithm includes at least one of the following genetic operators:
    a selection operator;
    a mutation operator;
    a recombination operator;
    a crossover operator;
    a directed operator;
    a constraint operator; or
    a preservation operator.

19. The method of claim 2, wherein the subjective value was selected from a range of possible subjective values.

20. The method of claim 1, wherein the evolutionary algorithm comprises a mutation operator configured to delete at least one gene of a genetic string and/or to add at least one random gene to a genetic string, and wherein applying the evolutionary algorithm to generate a first search query comprises applying the mutation operator to a genetic string associated with at least one item of the first plurality of items to generate the first search query.

21. The method of claim 2, wherein the first feedback comprises subjective values for at least two items of the first plurality of items, and the evolutionary algorithm generating the first search query is based on at least the said subjective values.

22. The method of claim 1, wherein the evolutionary algorithm comprises a crossover operator configured to combine genes of two genetic strings to produce at least one offspring, and a mutation operator configured to delete at least one gene of a genetic string and/or add at least one random gene to a genetic string, and wherein applying the evolutionary algorithm to generate a first search query comprises:
    applying the crossover operator to genetic strings respectively associated with at least two items of the first plurality of items to generate at least one offspring; and
    applying the mutation operator to at least one genetic string associated with at least one of the at least two items of the first plurality of items, or to at least one offspring.

23. The method of claim 1, further comprising receiving from the user modifications of at least one of the first search query and the second search query prior to causing the said search query to be executed.

24. The method of claim 1, further comprising:
    L) receiving from the user a selection of a first desired item from one of the plurality of items;
    M) receiving from the user a selection of a second desired item from another of the plurality of items; and
    N) generating a fourth search query based on the first desired item and the second desired item.

25. The method of claim 24, further comprising the first desired item from the presentation in which it was represented having been dragged into the presentation in which the second desired item was represented, and having been dropped onto the said second desired item.

26. The method of claim 24, wherein generating a fourth search query based on the first desired item and the second desired item comprises applying an evolutionary algorithm to a genetic string associated with the first desired item and a genetic string associated with the second desired item.

27. The method of claim 1, wherein causing a first information set comprising a first plurality of items to be generated comprises causing at least a portion of the first information set to be generated randomly.

28. The method of claim 1, wherein causing a first information set comprising a first plurality of items to be generated comprises causing a search query to be executed.

29. A computer-readable medium having computer-readable signals stored thereon that define instructions which, as a result of being executed by a computer, instruct the computer to perform a search method comprising:
    A) causing a first information set to be generated, comprising a first plurality of items, wherein each item of the first plurality of items is associated with at least one characteristic;
    B) representing at least some of the first information set in a first presentation;
    C) receiving a first feedback based upon the first presentation from a user;
    D) applying an evolutionary algorithm to a plurality of characteristics associated with the first plurality of items to generate a first search query, wherein the evolutionary algorithm is based on the first feedback;
    E) causing the first search query to be executed to generate a second information set comprising a second plurality of items, wherein each item of the second plurality of items is associated with at least one characteristic;
    F) representing at least some of the second information set in a second presentation;
    G) in response to a user input, repeating step B and representing at least some of the first information set in the first presentation;
    H) receiving a second feedback based upon the second presentation from a user;
    I) applying an evolutionary algorithm to a plurality of characteristics associated with the second plurality of items to generate a second search query, wherein the evolutionary algorithm is based on the second feedback;
    J) causing the second search query to be executed to generate a third information set comprising a third plurality of items, wherein each item of the third plurality of items is associated with at least one characteristic; and
    K) representing at least some of the third information set in a third presentation;
    wherein at least one characteristic associated with each item is chosen from a group comprising: at least one descriptor made available by a search engine or web directory service; at least one tag; at least one keyword; at least one classification-oriented identifier; at least one categorization-oriented identifier; and at least one semantic web-oriented identifier; and wherein at least one characteristic associated with each item is not a word or phrase selected from text displayed as part of the item.

30. A method, comprising:
A) causing a first search query to be executed to generate a first information set comprising a first plurality of items, wherein each item of the first plurality of items is associated with at least one characteristic;
B) representing at least some of the first information set in a first presentation;
C) causing a second search query to be executed to generate a second information set comprising a second plurality of items, wherein each item of the second plurality of items is associated with at least one characteristic;
D) representing at least some of the second information set in a second presentation;
E) receiving from a user a selection of a first desired item from the first plurality items;
F) receiving from a user a selection of a second desired item from the second plurality of items; and
G) generating a third search query based on the combination of the first desired item and the second desired item;
wherein generating a third search query based on the first desired item and the second desired item comprises applying an evolutionary algorithm to a genetic string comprising a plurality of characteristics associated with the first desired item and applying an evolutionary algorithm to a genetic string comprising a plurality of characteristics associated with the second desired item;
wherein at least one characteristic associated with each item is chosen from a group comprising: at least one descriptor made available by a search engine or web directory service; at least one tag; at least one keyword; at least one classification-oriented identifier; at least one categorization-oriented identifier; and at least one semantic web-oriented identifier; and
wherein at least one characteristic associated with each item is not a word or phrase selected from text displayed as part of the item.

31. The method of claim 30, further comprising the first desired item having been dragged from the first presentation into the second presentation, and dropped onto the second desired item in the second presentation.

32. The method of claim 30, wherein the first search query and the second search query each are executed by the search engine.

33. The method of claim 30, wherein the first search query and the second search query each are executed by the web directory service.

34. The method of claim 30, wherein the first plurality of items and the second plurality of items comprise a plurality of goods for purchase and/or a plurality of services for purchase.

35. The method of claim 30, wherein the first information set and the second information set each comprise a plurality of images or diagrams.

36. The method of claim 35, wherein at least some of the first information set is displayed graphically as a grid of images and/or diagrams in the first presentation, and at least some of the second information set is displayed graphically as a grid of images and/or diagrams in the second presentation.

37. The method of claim 30, wherein the at least one characteristic associated with at least one item of at least one plurality of items comprises a descriptor made available by the search engine or web directory service.

38. The method of claim 30, wherein the at least one characteristic associated with at least one item of at least one plurality of items comprises a tag.

39. The method of claim 30, wherein the evolutionary algorithm comprises a crossover operator configured to combine genes of two genetic strings to produce at least one offspring, and a mutation operator configured to delete at least one gene of a genetic string and/or add at least one random gene to a genetic string, and wherein applying the evolutionary algorithm to generate a third search query comprises:
applying the crossover operator to genetic strings respectively comprising a plurality of characteristics associated with the first desired item and the second desired item to generate at least one offspring; and
applying the mutation operator to at least one of the genetic string comprising a plurality of characteristics associated with the first desired item, the genetic string comprising a plurality of characteristics associated with the second desired item, and the genetic string comprising a plurality of characteristics associated with the at least one offspring.

40. A computer-readable medium having computer-readable signals stored thereon that define instructions which, as a result of being executed by a computer, instruct the computer to perform a method comprising:
A) causing a first search query to be executed to generate a first information set comprising a first plurality of items, wherein each item of the first plurality of items is associated with at least one characteristic;
B) representing at least some of the first information set in a first presentation;
C) causing a second search query to be executed to generate a second information set comprising a second plurality of items, wherein each item of the second plurality of items is associated with at least one characteristic;
D) representing at least some of the second information set in a second presentation.
E) receiving from a user a selection of a first desired item from the first plurality items;
F) receiving from a user a selection of a second desired item from the second plurality of items; and
G) generating a third search query based on the combination of the first desired item and the second desired item;
wherein generating a third search query based on the first desired item and the second desired item comprises applying an evolutionary algorithm to a genetic string comprising a plurality of characteristics associated with the first desired item and applying an evolutionary algorithm to a genetic string comprising a plurality of characteristics associated with the second desired item;
wherein at least one characteristic associated with each item is chosen from a group comprising: at least one descriptor made available by a search engine or web directory service; at least one tag; at least one keyword; at least one classification-oriented identifier; at least one categorization-oriented identifier; and at least one semantic web-oriented identifier; and
wherein at least one characteristic associated with each item is not a word or phrase selected from text displayed as part of the item.

41. A method, comprising:
A) causing a first search query to be executed to generate a first information set comprising a first plurality of items, wherein each item of the first plurality of items is associated with at least one characteristic;

B) representing at least some of the first information set in a first presentation;

C) in response to a user input, saving at least one item of the first plurality of items in a location specified by the user;

D) causing a second search query to be executed to generate a second information set comprising a second plurality of items, wherein each item of the second plurality of items is associated with at least one characteristic;

E) representing at least some of the second information set in a second presentation;

F) in response to a user input, retrieving at least one saved item of the first plurality of items; and G) generating a third search query based on a combination of the at least one saved item of the first plurality of items and at least one of the second plurality of items;

wherein generating a third search query based on the combination of the at least one saved item and the at least one of the second plurality of items comprises applying an evolutionary algorithm to a genetic string comprising a plurality of characteristics associated with the at least one saved item and applying an evolutionary algorithm to a genetic string comprising a plurality of characteristics associated with the at least one of the second plurality of items;

wherein at least one characteristic associated with each item is chosen from a group comprising: at least one descriptor made available by a search engine or web directory service; at least one tag; at least one keyword; at least one classification-oriented identifier; at least one categorization-oriented identifier; and at least one semantic web-oriented identifier; and wherein at least one characteristic associated with each item is not a word or phrase selected from text displayed as part of the item.

42. The method of claim 41, further comprising the at least one saved item having been dragged from the first presentation into the specified location, and dropped onto the specified location.

43. The method of claim 41, wherein the first search query, the second search query and the third search query each are executed by the search engine.

44. The method of claim 41, wherein the first search query, the second search query and the third search query each are executed by the web directory service.

45. The method of claim 41, wherein the first plurality of items and the second plurality of items comprise a plurality of goods for purchase and/or a plurality of services for purchase.

46. The method of claim 41, wherein the first information set and the second information set each comprise a plurality of images or diagrams.

47. The method of claim 46, wherein at least some of the first information set is displayed graphically as a grid of images and/or diagrams in the first presentation, and at least some of the second information set is displayed graphically as a grid of images and/or diagrams in the second presentation.

48. The method of claim 41, wherein the at least one characteristic associated with at least one item of at least one plurality of items comprises a descriptor made available by the search engine or web directory service.

49. The method of claim 41, wherein the at least one characteristic associated with at least one item of at least one plurality of items comprises a tag.

50. The method of claim 41, wherein the evolutionary algorithm comprises a crossover operator configured to combine genes of two genetic strings to produce at least one offspring, and a mutation operator configured to delete at least one gene of a genetic string and/or add at least one random gene to a genetic string, and wherein applying the evolutionary algorithm to generate a third search query comprises:

applying the crossover operator to genetic strings respectively comprising a plurality of characteristics associated with the at least one saved item and at least one of the second plurality of items to generate at least one offspring; and applying the mutation operator to at least one of the genetic string comprising a plurality of characteristics associated with the at least one saved item, the genetic string comprising a plurality of characteristics associated with at least one of the second plurality of items, and the genetic string comprising a plurality of characteristics associated with the at least one offspring.

51. A computer-readable medium having computer-readable signals stored thereon that define instructions which, as a result of being executed by a computer, instruct the computer to perform a method comprising:

A) causing a first search query to be executed to generate a first information set comprising a first plurality of items, wherein each item of the first plurality of items is associated with at least one characteristic;

B) representing at least some of the first information set in a first presentation;

C) in response to a user input, saving at least one item of the first plurality of items in a location specified by the user;

D) causing a second search query to be executed to generate a second information set comprising a second plurality of items, wherein each item of the second plurality of items is associated with at least one characteristic;

E) representing at least some of the second information set in a second presentation;

F) in response to a user input, retrieving at least one saved item of the first plurality of items; and G) generating a third search query based on a combination of the at least one saved item of the first plurality of items and at least one of the second plurality of items;

wherein generating a third search query based on the combination of the at least one saved item and the at least one of the second plurality of items comprises applying an evolutionary algorithm to a genetic string comprising a plurality of characteristics associated with the at least one saved item and applying an evolutionary algorithm to a genetic string comprising a plurality of characteristics associated with the at least one of the second plurality of items;

wherein at least one characteristic associated with each item is chosen from a group comprising: at least one descriptor made available by a search engine or web directory service; at least one tag; at least one keyword; at least one classification-oriented identifier; at least one categorization-oriented identifier; and at least one semantic web-oriented identifier; and wherein at least one characteristic associated with each item is not a word or phrase selected from text displayed as part of the item.

* * * * *